(12) United States Patent  (10) Patent No.: US 8,131,863 B2
Takeda et al.  (45) Date of Patent: *Mar. 6, 2012

(54) ADDRESS TRANSLATOR, MESSAGE PROCESSING METHOD AND EQUIPMENT

(75) Inventors: Yukiko Takeda, Tokorozawa (JP); Hidenori Inouchi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,721

(22) Filed: Aug. 9, 2010

(65) Prior Publication Data

US 2010/0325292 A1 Dec. 23, 2010

Related U.S. Application Data

(63) Continuation of application No. 12/371,950, filed on Feb. 17, 2009, now Pat. No. 7,788,408, which is a continuation of application No. 10/081,535, filed on Feb. 25, 2002, now Pat. No. 7,761,597.

(30) Foreign Application Priority Data

Dec. 7, 2001 (JP) ................................ 2001-373520

(51) Int. Cl.
*G06F 15/16* (2006.01)
(52) U.S. Cl. ........ 709/228; 370/392; 709/237; 709/238; 414/400; 702/170
(58) Field of Classification Search .................. 709/228, 709/237, 238; 414/400; 702/170
See application file for complete search history.

(56) References Cited

U.S. PATENT DOCUMENTS

| 6,101,189 A | 8/2000 | Tsuruoka |
| 6,118,784 A | 9/2000 | Tsuchiya et al. |
| 6,128,664 A | 10/2000 | Yanagidate et al. |
| 6,263,393 B1 | 7/2001 | Funaya et al. |
| 6,343,249 B1 | 1/2002 | Sakai et al. |
| 6,400,729 B1 | 6/2002 | Shimadoi et al. |
| 6,411,632 B2 | 6/2002 | Lindgren et al. |
| 6,636,516 B1 | 10/2003 | Yamano |
| 6,690,669 B1 * | 2/2004 | Tsuchiya et al. ............... 370/392 |
| 6,708,219 B1 | 3/2004 | Borella et al. |
| 6,709,219 B2 * | 3/2004 | Reed, III ........................ 414/400 |
| 6,731,642 B1 | 5/2004 | Borella et al. |

(Continued)

FOREIGN PATENT DOCUMENTS

CN 1270729 9/1998

(Continued)

OTHER PUBLICATIONS

S. Okamoto et al, IN99-30 "WANI: A Protocol Translator for Internet Protocol Version 6", Technical report of IEICE, Jul. 16, 1999, vol. 99, No. 188, pp. 15-20.

(Continued)

*Primary Examiner* — Tammy Nguyen
(74) *Attorney, Agent, or Firm* — Mattingly & Malur, PC

(57) ABSTRACT

An address translator includes an SIP message detecting function. Upon detection of an SIP message, the address translator sends the SIP message to an SIP address translator. The SIP address translator extracts addresses for translation, and makes a query to the address translator. The SIP address translator translates an IP address included in the SIP message, using translation information of the address translator. Thus, an SIP communication is accomplished between terminals belonging to different regions in association of the address translator and the SIP address translator.

15 Claims, 35 Drawing Sheets

U.S. PATENT DOCUMENTS

| | | | |
|---|---|---|---|
| 6,816,912 B1 * | 11/2004 | Borella et al. | 709/238 |
| 6,862,274 B1 | 3/2005 | Tsao et al. | |
| 6,882,957 B2 * | 4/2005 | Yamamoto | 702/170 |
| 7,042,876 B1 | 5/2006 | Jayasenan et al. | |
| 2001/0002198 A1 | 5/2001 | Lindgren et al. | |
| 2001/0032270 A1 * | 10/2001 | Koo | 709/237 |
| 2001/0049825 A1 | 12/2001 | Hirose et al. | |
| 2002/0026475 A1 | 2/2002 | Marmor | |
| 2002/0138622 A1 | 9/2002 | Dorenbosch et al. | |
| 2002/0169887 A1 | 11/2002 | MeLampy et al. | |
| 2003/0048804 A1 | 3/2003 | Inouchi et al. | |
| 2003/0050051 A1 | 3/2003 | Vilander | |
| 2003/0225912 A1 | 12/2003 | Takeda et al. | |

FOREIGN PATENT DOCUMENTS

| | | |
|---|---|---|
| JP | 10-136052 | 5/1998 |
| JP | 2000-156709 | 6/2000 |
| JP | 2001-274419 | 10/2001 |
| JP | 2001-313676 | 11/2001 |
| JP | 03-09387 | 1/2002 |
| JP | 2009-207207 A | 9/2009 |
| WO | 9914910 | 3/1999 |

OTHER PUBLICATIONS

Srisuresh, P. et al, "DNS Extensions to Network Address Translators (DNS_ALG)", Network Working Group Request for Comments, Sep. 1999, p. 5, line 14 and p. 10, line 3.

G. Tsirtsis et al, Network Address Translation—Protocol Transistion, Feb. 2000, pp. 3-4.

Internet RFC (Request for Comments) Dictionary, ASCII Pub. Dept., May 20, 1999, pp. 323-329.

J. Rosenberg, "Getting SIP Through Firewalls and NATS", IETF Internet Draft, Feb. 22, 2000, pp. 3-11.

M. Shore, "H.323 and Firewalls: Problem Statement and Solution Framework". Internet Draft, Feb. 3, 2000, p. 6.

C. Martin et al., SIP Through NAT Enabled Firewall Call Flows, draft-martin-midcom-sip-natfw-callflows-00.txt, Feb. 2001, 32 pp., Internet Draft, Midcom Working Groug.

P. Srisuresh et al., Middlebox communication architecture and framework, <draft-ietf-midcom-framework-05.txt>, Nov. 12, 2001, 36 pp., Internet-Draft, Network Working Group.

* cited by examiner

FIG.8

401 SIP INVITE MESSAGE EXAMPLE 1
(TERMINAL 6a → SIP SERVER 5a)

START-LINE ( INVITE sip: userB@biloxi.com SIP/2.0

MESSAGE-HEADER
- Via: SIP/2.0/UDP a6
- To: Bob <sip:userB@biloxi.com>
- From: Alice <sip:userA@atlanta.com>;tag=123
- Call-ID: 12345@ a6
- CSeq: 1 INVITE
- Contact: <sip:userA@ a6>
- Content-Type: application/sdp MESSAGE-BODY
- v=0
- o=UserB 123 456 IN IP4 userA.atlanta.com
- c=IN IP6 a6
- m=audio 45678

FIG.9

402 SIP INVITE MESSAGE EXAMPLE 2
(SIP SERVER 5a → ADDRESS TRANSLATOR 1)

START-LINE ( INVITE sip: userB@biloxi.com SIP/2.0

MESSAGE-HEADER
- Via: SIP/2.0/UDP sipa6
  SIP/2.0/UDP a6
- To: Bob <sip:userB@biloxi.com>
- From: Alice <sip:userA@atlanta.com>;tag=123
- Call-ID: 12345@ a6
- CSeq: 1 INVITE
- Contact: <sip:userA@ a6>
- Content-Type: application/sdp MESSAGE-BODY
- v=0
- o=UserB 123 456 IN IP4 userA.atlanta.com
- c=IN IP6 a6
- m=audio 45678

FIG.10

<u>403 SIP INVITE MESSAGE EXAMPLE 3
(ADDRESS TRANSLATOR 1 → SIP SERVER 5b)</u>

START-LINE ( INVITE sip: userB@biloxi.com SIP/2.0

MESSAGE-HEADER
- Via: SIP/2.0/UDP sipa4
  SIP/2.0/UDP va4
- To: Bob <sip:userB@biloxi.com>
- From: Alice <sip:userA@atlanta.com>;tag=123
- Call-ID: 12345@ va4
- CSeq: 1 INVITE
- Contact: <sip:userA@ va4>
- Content-Type: application/sdp MESSAGE-BODY
- v=0
- o=UserB 123 456 IN IP4 userA.atlanta.com
- c=IN IP4 va4
- m=audio 45678

FIG.11

404 SIP INVITE MESSAGE EXAMPLE 4
(SIP SERVER 5b → TERMINAL 6b)

START-LINE ( INVITE sip: userB@biloxi.com SIP/2.0

MESSAGE-HEADER
- Via: SIP/2.0/UDP sipb4
  SIP/2.0/UDP vsipa4
  SIP/2.0/UDP va4
- To: Bob <sip:userB@biloxi.com>
- From: Alice <sip:userA@atlanta.com>;tag=123
- Call-ID: 12345@ va4
- CSeq: 1 INVITE
- Contact: <sip:userA@ va4>
- Content-Type: application/sdp MESSAGE-BODY
- v=0
- o=UserB 123 456 IN IP4 userA.atlanta.com
- c=IN IP4 va4
- m=audio 45678

FIG.12

405 SIP 200 OK MESSAGE EXAMPLE 1
(TERMINAL 6b → SIP SERVER 5b)

START-LINE ( SIP/2.0 200 OK

MESSAGE-HEADER
- Via: SIP/2.0/UDP sipb4
  - SIP/2.0/UDP vsipa4
  - SIP/2.0/UDP va4
- To: Bob <sip:userB@biloxi.com> ;tag=111
- From: Alice <sip:userA@atlanta.com>;tag=123
- Call-ID: 12345@ va4
- CSeq: 1 INVITE
- Contact: <sip:userB@ b4>
- Content-Type: application/sdp MESSAGE-BODY
- v=0
- o=UserB 123 456 IN IP4 userB.biloxi.com
- c=IN IP4 b4
- m=audio 35678

FIG.13

406 SIP 200 OK MESSAGE EXAMPLE 2
(SIP SERVER 5b → ADDRESS TRANSLATOR 1)

START-LINE ( SIP/2.0 200 OK

MESSAGE-HEADER
- Via: SIP/2.0/UDP vsipa4
  SIP/2.0/UDP va4
- To: Bob <sip:userB@biloxi.com> ;tag=111
- From: Alice <sip:userA@atlanta.com>;tag=123
- Call-ID: 12345@ va4
- CSeq: 1 INVITE
- Contact: <sip:userB@ b4>
- Content-Type: application/sdp MESSAGE-BODY
- v=0
- o=UserB 123 456 IN IP4 userB.biloxi.com
- c=IN IP4 b4
- m=audio 35678

FIG.14

407 SIP 200 OK MESSAGE EXAMPLE 3
(ADDRESS TRANSLATOR 1 → SIP SERVER 5a)

START-LINE ( SIP/2.0 200 OK

MESSAGE-
HEADER
- Via: SIP/2.0/UDP sipa6
  SIP/2.0/UDP a6
- To: Bob <sip:userB@biloxi.com> ;tag=111
- From: Alice <sip:userA@atlanta.com>;tag=123
- Call-ID: 12345@ a6
- CSeq: 1 INVITE
- Contact: <sip:userB@ vb6>
- Content-Type: application/sdp MESSAGE-BODY
- v=0
- o=UserB 123 456 IN IP4 userB.biloxi.com
- c=IN IP6 vb6
- m=audio 35678

FIG.15

408 SIP INVITE MESSAGE EXAMPLE 4
(SIP SERVER 5a → TERMINAL 6a)

START-LINE ( SIP/2.0 200 OK

MESSAGE-HEADER
- Via: SIP/2.0/UDP a6
- To: Bob <sip:userB@biloxi.com> ;tag=111
- From: Alice <sip:userA@atlanta.com>;tag=123
- Call-ID: 12345@ a6
- CSeq: 1 INVITE
- Contact: <sip:userB@ vb6>
- Content-Type: application/sdp MESSAGE-BODY
- v=0
- o=UserB 123 456 IN IP4 userB.biloxi.com
- c=IN IP6 vb6
- m=audio 35678

650 ADDRESS QUERY REQUEST RESPONSE

60 SIP MESSAGE TRANSLATION PROCESSING ROUTINE 1

FIG.19

500 TRANSLATION INFORMATION TABLE

| IPv4 ADDRESS (501) | IPv6 ADDRESS (502) | |
|---|---|---|
| va4 | a6 | 500-1 |
| vsipa4 | sipa6 | 500-2 |
| b4 | vb6 | 500-3 |
| sipb4 | vsipb6 | 500-4 |
| ⋮ | | 500-n |

FIG.21

410 EXAMPLE OF SIP MESSAGE WITH TAG

START-LINE ( nat123-INVITE sip:userB@biloxi.com SIP/2.0

MESSAGE-HEADER
- nat123-Via: SIP/2.0/UDP sipa6
    SIP/2.0/UDP a6
- nat123-To: Bob <sip:userB@biloxi.com>
- nat123-From: Alice <sip:userA@atlanta.com>;tag=123
- nat123-Call-ID: 12345@ a6
- CSeq: 1 INVITE
- nat123-Contact: <sip:userA@ a6>
- Content-Type: application/sdp MESSAGE-BODY
- v=0
- nat123-o=UserB 123 456 IN IP4 userA.atlanta.com
- nat123-c=IN IP6 a6
- m=audio 45678

80 TAG ADDITION PROCESSING ROUTINE IN ADDRESS TRANSLATOR

FIG.25

412 PARAMETOR LIST FOR TRANSLATION

| | |
|---|---|
| START-LINE | REQUEST-URI |
| MESSAGE HEADER | VIA |
| | CONTACT |
| | RECORD-ROUTE |
| | ROUTE |
| | TO |
| | FROM |
| | CALL-ID |
| MESSAGE BODY | c= |
| | o= |
| | m= |

FIG.26

413 NAT-PT TRANSLATION RULE

| FIELD FOR TRANSLATION | | ACTION |
|---|---|---|
| START-LINE | REQUEST-URI | ADDRESS TRANSLATION |
| MESSAGE-HEADER | VIA<br>CONTACT<br>RECORD-ROUTE<br>ROUTE<br>TO<br>FROM<br>CALL-ID | ADDRESS TRANSLATION |
| MESSAGE BODY | o<br>c | ADDRESS TRANSLATION |
| | m | NO TRANSLATION |

FIG.31

300 TAG MANAGEMENT TABLE

| TAG | TO (v6) | FROM (v6) | CALL-ID (v6) | TO (v4) | FROM (v4) | CALL-ID (v4) | |
|---|---|---|---|---|---|---|---|
| | | | | | | | 300-1 |
| | | | | | | | 300-2 |
| | | | | | | | 300-n |

Columns: 301, 302, 303, 304, 305, 306, 307

FIG.32

310 MEDIA INFORMATION MANAGEMENT TABLE

| TAG | c (v6) | m (v6) | c (v4) | m (v4) |
|---|---|---|---|---|
|  |  |  |  |  |
|  |  |  |  |  |
|  |  |  |  |  |

311 312 313 314 315

310-1
310-2
310-n

ADDRESS TRANSLATOR, MESSAGE PROCESSING METHOD AND EQUIPMENT

CROSS-REFERENCES

This is a continuation application of U.S. Ser. No. 12/371,950, filed Feb. 17, 2009 (now U.S. Pat. No. 7,788,408), which is a continuation application of U.S. Ser. No. 10/081,535, filed Feb. 25, 2002 (now U.S. Pat. No. 7,761,597), the entire disclosures of which are hereby incorporated by reference and which claim priority to JP 2001-373520, filed Dec. 7, 2001.

BACKGROUND OF THE INVENTION

The present invention relates to a system for interconnecting networks which conform to the same protocol, or networks which conform to different protocols.

The IP (Internet Protocol) networks represented by the Internet are now rapidly developing. A sudden increase in Internet users results in an increased proportion of data communications in communication networks. Communication operators are considering the construction of an IP-based next generation communication network for fusion of data communications and audio communications.

VoIP (Voice over IP) is a technology for transmitting audio information on an IP network. VoIP first sets a virtual communication path (session) between communication devices. IP packetized audio data is transferred on the set communication path. A session control protocol is requested for controlling the establishment, maintenance and disconnection of the session between communication devices.

IETF (Internet Engineering Task Force) has specified the SIP (Session Initiation Protocol) (IETF RFC2543) for establishing and terminating a session for an IP multimedia communication. Because of its high expendability in function, the SIP is drawing attention as a session control protocol for VoIP.

The SIP is an application protocol which utilizes a transport mechanism such as TCP (Transmission Control Protocol) and UDP (User Datagram Protocol). The SIP is a text-based protocol which is comprised of a header for carrying a request or a response, and a message body for describing the contents of a session. For describing a session in the SIP, SDP (Session Description Protocol) (IETF RFC2327), for example, is applied.

The SIP employs an architecture of a client server model. A user agent client sends an SIP request to a proxy (SIP server) of a user agent server. The SIP server solves the address of the destination using DNS (Domain Name System) or the like to establish a session between terminals.

The SIP server has a proxy mode and a redirect mode depending on its role. In the proxy mode, a proxy server mediates a request for establishing a session between a user agent client and a user agent server. In the redirect mode, a user agent client directly connects to a user agent server, making use of information on the destination acquired from an SIP redirect server.

In the following, description will be made on an SIP connection procedure using the SIP server in the proxy mode. When a terminal x on an IP network begins an audio communication with a terminal y on the IP network using the SIP, the terminal x sends a call setting request (INVITE) to the SIP server. The SIP server identifies position information of the terminal y, and sends the call setting request. The terminal y sends a response indicative of acceptance of the call. This response is sent to the terminal x via the SIP server through which the call setting request has passed. The terminal x confirms the reception of the response by sending an ACK request to the terminal y. The ACK request is transferred by the SIP server or directly sent to the terminal y. In the foregoing manner, a communication is available between the terminal x and terminal y. Generally, the call setting request and response include information (session description) for transferring user information (audio packets) between the terminal x and terminal y. The SDP or the like is applied to the session description. The terminal x (terminal y) sends user information to a destination specified by the terminal y (terminal x).

In accordance with the specifications of the SIP and SDP, information on the terminals and SIP server can be specified by an IP address.

On the other hand, the rapid spread of the IP networks increases the importance of the technology for interconnecting regions which differ in addressing system from each other.

For example, a method of using NAT (Network Address Translator) technology (IETF RFC1631) is known as a technology for interconnecting a network which confirms to private addresses and a network which conforms to global addresses.

The NAT translates a private IPv4 address to a global IPv4 address, or vice versa. The basic NAT rewrites one of a source address and a destination address at the time a datagram passes between two regions connected by an NAT router. When an address space allocated to the private network collides with an address space allocated to the public network, a twice NAT technology may be often used for solving the collision of addresses. The twice NAT technology rewrites both of the source address and destination address at the time a datagram passes between two regions connected by a twice NAT router.

The twice NAT operates in the following manner for solving the collision of addresses. When Host-A in the private region begins a communication with Host-X in the public region, Host-A sends a packet for inquiring the DNS address of Host-X. DNS-ALG (Domain Name Service—Application Level Gateway) captures this packet, translates the address for Host-X to an address (Host-XPRIME) which can be routed within the private region, and returns the translated address to Host-A. When the DNS address is solved, Host-A begins a communication with Host-XPRIME. At the time this packet passes the twice NAT, the source address is rewritten to an address possessed by the NAT, and the destination address is rewritten to the address of Host-X. A similar translation to the foregoing is applied to a return packet from Host-X. Details on the operation of the DNS-ALG are described in IETF RFC2694.

The foregoing is an exemplary technology which is used when a network to which a certain terminal belongs employs the same protocol as a network to which a destination terminal belongs. When a network to which a certain terminal belongs differs in communication protocol from a network to which a destination terminal belongs, NAT-PT (IETF RFC2766), SOCKS64 (IETF RFC3089) and the like are known as translation schemes for connecting a network which uses, for example, IPv4 as the protocol (hereinafter called the IPv4 network) to a network which uses Internet Protocol version 6 as the protocol (hereinafter called the IPv6 network).

Basically, either of these schemes mutually translates the format of the IP packet between IPv4 and IPv6. For example, IPv4 addresses are translated to IPv6 addresses, or vice versa. A device which is responsible for this translation is hereinafter called a translator. For the translation, the translator must create and hold a correspondence relationship between the IPv4 addresses and IPv6 addresses before the translation. When this correspondence relationship is dynamically created each time a communication is made, the name solution of DNS (domain name system) is utilized as a trigger (see Internet RFC Dictionary, pp 323-329, ASCII Edition).

The DNS is a system for translating a name (character string) readily perceptible to humans such as URL of a web to an IP address. In the following, the operation of translating a name to an IP address is called a name solution. Today, almost all applications on the Internet utilizes this DNS to acquire an IP address of a communication party.

The NAT and translator, making use of this fact, monitor at all times messages of the DNS communicated at the outset of a communication, and take advantage of a message for requesting a name solution for creating translation information (a correspondence relationship of IP addresses, and the like). Specifically, assuming that an IPv6 terminal conducts a name solution for a certain name, and an IP address, which is a response thereto, is IPv4, the IPv4 address is rewritten to an IPv6 address which is sent back to the IPv6 terminal. Then, the IPv4 address before the rewriting is corresponded to the rewritten IPv6 address. In other words, the DNS-ALG intercepts the response message to the name solution for the rewriting, and dynamically creates the translation information based on the original and rewritten information.

SUMMARY OF THE INVENTION

An IP packet is comprised of an IP header which includes packet transfer information, a TCP/UDP header, and a payload. A translator represented by the NAT and NAT-PT does not translate an IP address included in the payload. An SIP message is set in the payload.

On the other hand, the SIP and SDP can set an IP address in the payload, as mentioned above.

However, when a region A and a region B are interconnected by an address translator and a terminal belonging to the region A communicates with a terminal belonging to the region B through the SIP, the conventional NAT and translator do not translate an IP address set in the SIP and SDP, resulting in a failure in a communication between the terminals through SIP.

It is an object of the present invention to provide an SIP message translation system which enables SIP-based communications between a certain terminal belonging to a network and a destination terminal belonging to another network even if the two network differ in the addressing system from each other.

According to one aspect of the present invention, a method of processing a message including a first portion and a second portion includes:

first translation processing for translating information in the first part from information conforming to a first protocol (or addressing system) to information conforming to a second protocol (or addressing system);

determination processing for determining whether or not the second portion requires a translation; and second translation processing for translating information in the second portion, determined to require a translation, from information conforming to the first protocol to information conforming to the second protocol.

The order of the first translation processing and second translation processing is arbitrary.

These operations may be performed by using a first server and a second server, wherein the first translation processing is performed by the first server, and at least information in the second portion is transferred from the first server to the second server which extracts a parameter that requires a translation from the second portion, and performs the second translation processing on the extracted parameter, followed by a transfer from the second server to the first server of the information in the second portion which has undergone the second translation processing.

Alternatively, a plurality of processors interconnected through an internal bus within a single server may perform the processing in cooperation. Further alternatively, a plurality of programs running on a single processor within a single server may perform the processing in cooperation.

As a typical application example, the first portion is an IP header, the second portion is a payload including an SIP message, one of the first protocol and second protocol is IPv4, the other protocol is IPv6, and information to be translated is an address.

Also, according to another aspect of the present invention, an address translator is connected to both a first network conforming to a first protocol and a second network conforming to a second protocol. The address translator has a memory part for holding a translation rule for translating the first protocol to the second protocol, or vice versa, a translating part for translating a first address of input information conforming to the first protocol to a second address conforming to the second protocol, or vice versa, and a function of outputting the input information and the translation rule.

A destination, to which the input information and translation rule is outputted, is another server external to the address translator, another block connected to an internal bus within the address translator, or another processing block within the same processor.

In a preferred example, input information, the protocol of which is translated in the destination using the input information and translation rule, is inputted again to the address translator.

According to another aspect of the present invention, an address translator for connecting a network A conforming to a protocol P to a network B conforming to a protocol Q, has an address translating function for translating an address conforming to the protocol P to an address conforming to the protocol Q, or vice versa, and a detecting function for detecting a communication conforming to a particular protocol, wherein the address translator translates an address described in a first region of communication data by the address translation function, and when the address translator detects a communication conforming to the particular protocol, the address translator creates translation information including a correspondence relationship between addresses in the protocol P and addresses in protocol Q for translating an address described in a second region of the communication data.

More specifically, in a communication network for interconnecting networks which differ in addressing system from one another, at least following two means are provided in addition to a conventional address translator represented by the NAT and translator: (1) means for causing the address translator to detect an SIP message communicated between different region; and (2) SIP message translating means for translating an IP address set in the SIP and SDP in accordance with an address translation scheme of the address translator.

The address translator detects an SIP message based on the IP address of an SIP server, or a combination of the IP address and a port number of the SIP server, or the port number. When the address translator which interconnects the networks having different addressing systems detects an SIP message sent from a terminal or the SIP server, the address translator initiates the SIP message translating means.

The SIP message translating means includes at least the following three functions: (1) a function of detecting a parameter for translation in the SIP message; (2) a translation rule corresponding to an address translation scheme provided by the address translator; and (3) a function of rewriting the SIP message, making use of a translation entry of the address translator. The address translator creates a translation entry based on a request from an SIP address translator. The address translator rewrites header information in a packet communicated between communication terminals based on the translation entry.

For implementing the functions of the SIP message translating means, there are the following three forms.

A first implementation provides an SIP address translator which has SIP message translating means. The SIP address translator rewrites an IP address included in an SIP message, making use of a translation entry of the address translator.

In a second implementation, the address translator has a function of detecting a parameter for translation in an SIP message, and adds identification information (tag) to the parameter for translation. The SIP address translator has a translation rule, and a function of rewriting an IP address included in an SIP message. The SIP address translator rewrites an IP address included in an SIP message, making use of a translation entry of the address translator.

In a third implementation, the address translator includes SIP message translating means.

When the present invention is applied, IP address information included in an SIP message communicated between different regions is translated, making use of the translation entry of the address translator. It is therefore possible to provide a VoIP-based audio communication service between terminals belonging to different regions.

A communication network according to another aspect of the present invention has the following features.

(1) A communication network in which a network A conforming to a certain protocol P and a network B conforming to a certain protocol Q are interconnected through an address translator, wherein:

the address translator includes a function of translating the protocol P to the protocol Q, or vice versa, a function of detecting an SIP communication, information and communication means required for communicating with a server device, and a function of creating translation information including a correspondence relationship between addresses in the protocol P and addresses in the protocol Q in association with the server device when an SIP communication is detected; and the server device includes translation information and means required for mutually translating the protocols P, Q in the address translator when information for translation is included in an SIP communication, and information and communication means required for communicating with the address translator, wherein with regard to an SIP communication from the network A conforming to the protocol P to the network B conforming to the protocol Q, the SIP communication is detected by the address translator, and the server device translates information in the SIP communication from an address conforming to the protocol P to an address conforming to the protocol Q with reference to translation information possessed by the address translator; and with regard to a communication from the network A conforming to the protocol P to the network B conforming to the protocol Q, an address conforming to the protocol P is translated to an address conforming to the protocol Q with reference to the translation information possessed by the address translator.

As described in (1), an SIP-based audio communication can be accomplished between terminals belonging to an IPv4 network and an IPv6 network when the address translator according to one aspect of the present invention interconnects a network conforming to an IPv4 address and a network conforming to an IPv6 address, and the SIP address translator according to the present invention rewrites an IP address included in an SIP message.

According to another aspect of the present invention, when an address translator according to one embodiment of the present invention interconnects a network 1 confirming to an IPv4 private address and a network 2 conforming to an IPv4 global address, and an SIP address translator according to one embodiment of the present invention rewrites an IP address included in an SIP message, an SIP-based audio communication can be accomplished between a terminal belonging to the network 1 and a terminal belonging to the network 2. Specifically, the following configuration (2) is provided.

(2) A communication network in which a plurality of networks A1, A2 conforming to a certain protocol P are connected through an address translator, wherein:

the address translator has a function of translating the protocol P of the network A1 to the protocol P of the network A2, or vice versa, a function of detecting an SIP communication, information and communicating means required for communicating with a server device, and a function of creating translation information including a correspondence relationship between addresses in the network A1 and addresses in the network A2 in association with the server device when an SIP communication is detected;

the server device has translation information and means required for translating addresses in the network A1 to addresses in the network A2, or vice versa in the address translator when information for translation is included in an SIP communication, and information and communicating means required for communicating the address translator;

with regard to an SIP communication from the network A1 to the network A2, the address translator detects the SIP communication, and the server device translates information in the SIP communication from an address in the network A1 to an address in the network A2 with reference to translation information possessed by the address translator; and with regard to a communication from the network A1 conforming to the protocol P to the network A2 conforming to the protocol P, an address in the network A1 is translated to an address in the network A2 with reference to the translation information possessed by the address translator.

(3) The communication network described in (1) or (2), wherein the address translator further has a function of detecting information for translation included in the SIP communication, and adding identification information, and the server device detects an object for translation using the identification information.

(4) The communication network described in (3), wherein the address translator further has a function of corresponding the identification information to SIP communication information, and the address translator further has a function of deleting translation information corresponding to the identification information at the end of the SIP communication.

(5) The communication network described in (1)-(4), wherein the address translator detects the SIP communication based on information on a destination, information on the destination and a port thereof, or information on the port.

(6) A communication network in which a network A conforming to a certain protocol P and a network B conforming to a certain protocol Q are interconnected through an address translator, wherein:

the address translator has a function of translating the protocol P to the protocol Q, or vice versa, a function of detecting an SIP communication, a function of creating translation information including a correspondence relationship between addresses in the protocol P and addresses in the protocol Q, and means for creating translation information required for mutually translating the protocols P, Q when information for translation is included in the SIP communication;

with regard to an SIP communication from the network A conforming to the protocol P to the network B conforming to the protocol Q, the address translator detects the SIP communication, and translates information in the SIP communication from an address conforming to the protocol P to an address conforming to the protocol Q with reference to the translation information; and with regard to a communication from the network A conforming to the protocol P to the network B conforming to the protocol Q, an address conforming to the protocol P is translated to an address conforming to the protocol Q with reference to the translation information possessed by the address translator.

(7) A communication network in which a network A1 and a network A2 conforming to a certain protocol P are interconnected through an address translator, wherein:

the address translator has a function of translating the protocol P of the network A1 to the protocol P of the network A2, or vice versa, a function of detecting an SIP communication, a function of creating translation information including a correspondence relationship between addresses in the network A1 and addresses in the network A2, and a function of creating translation information required for translating an address in the network A1 to an address in the network A2, or vice versa, when information for translation is included in the SIP communication;

with regard to an SIP communication from the network A1 to the network A2, the address translator detects the SIP communication, and translates information in the SIP communication from an address in the network A1 to an address in the network A2 with reference to the translation information; and with regard to a communication from the network A1 to the network A2, an address in the network A1 is translated to an address in the network A2 with reference to the translation information possessed by the address translator.

A server device which embodies another aspect of the present invention is characterized by the followings.

(A) A communication network in which a network conforming to a certain protocol P and a network conforming to a certain protocol Q are interconnected through an address translator, wherein:

the address translator includes a function of translating the protocol P to the protocol Q, or vice versa, a function of detecting an SIP communication, information and communication means required for communicating with a server device, and a function of creating translation information including a correspondence relationship between addresses in the protocol P and addresses in the protocol Q in association with the server device when an SIP communication is detected; and the server device includes translation information and means required for mutually translating the protocols P, Q in the address translator when information for translation is included in an SIP communication, and information and communication means required for communicating with the address translator.

(B) A communication network in which a plurality of networks A1, A2 conforming to a certain protocol P are interconnected through an address translator, wherein:

the address translator has a function of translating the protocol P of the network A1 to the protocol P of the network A2, or vice versa, a function of detecting an SIP communication, information and communicating means required for communicating with a server device, and a function of creating translation information including a correspondence relationship between addresses in the network A1 and addresses in the network A2 in association with the server device when an SIP communication is detected; and the server device has translation information and means required for translating addresses in the network A1 to addresses in the network A2 in the address translator, or vice versa, when information for translation is included in an SIP communication, and information and communication means required for communicating the address translator.

Also, an address translator according to one aspect of the present invention is:

(1) an address translator for interconnecting a network A conforming to a certain protocol P and a network B conforming to a certain protocol Q, having:

a translation function of translating the protocol P to the protocol Q, or vice versa;

a communication function of communicating with a server device; and a translation information creating function of creating translation information including a correspondence relationship between addresses in the protocol P and addresses in the protocol Q, wherein the address translator transfers detected SIP communication data to the server device, and receives the SIP communication data, the protocol of which has been mutually translated by the server device based on the translation information.

(2) A communication network in which a plurality of networks A1, A2 conforming to a certain protocol P are interconnected through an address translator, wherein:

a server device includes translation information and means required for translating an address in the network A1 to an address in the network A2, or vice versa in the address translator when information for translation is included in an SIP communication, and information and communication means required for communicating with the address translator; and the address translator includes a function of translating the protocol P associated with the network A1 to the protocol P associated with the network A2, a function of detecting an SIP communication, information and communication means required for communicating with a server device, and a function of creating translation information including a correspondence relationship between addresses in the network A1 and addresses in the network A2 in association with the server device when an SIP communication is detected.

(3) The address translator described in (1) or (2), wherein the address translator further has a function of detecting information for translation included in the SIP communication, and adding identification information.

(4) The address translator described in (3), wherein the address translator further has a function of corresponding the identification information to SIP communication information, and the address translator further has a function of deleting translation information corresponding to the identification information at the end of the SIP communication.

(5) The address translator described above which detects the SIP communication based on information on a destination, information on the destination and a port thereof, or information on the port.

(6) In a communication network in which a network A conforming to a certain protocol P and a network B conforming to a certain protocol Q are interconnected through an address translator, the address translator includes:

a function of translating the protocol P to the protocol Q, or vice versa, a function of detecting an SIP communication, and a function of creating translation information including a correspondence relationship between addresses in the protocol P and addresses in the protocol Q; and means for creating translation information required for mutually translating the protocols P, Q when information for translation is included in an SIP communication, and rewriting contents of the communication with reference to the translation information.

(7) In a communication network in which a network A1 and a network A2 conforming to a certain protocol P are interconnected through an address translator, the address translator includes:

a function of translating the protocol P in the network A1 to the protocol P in the protocol A2, or vice versa, a function of detecting an SIP communication, and a function of creating translation information including a correspondence relationship between addresses in the network A1 and addresses in the network A2;

means for creating translation information required for translating an address in the network A1 to an address in the network A2, or vice versa, when information for translation is included in the SIP communication; and means for creating translation information required for translating an address in the network A1 to an address in the network A2, or vice versa, when information for translation is included in the SIP communication, and rewriting contents of the communication with reference to the translation information.

(8) The address translator described in (7), wherein the address translator detects the SIP communication based on information on a destination, information on the destination and a port thereof, or information on the port.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing SIP INVITE message example 1;

FIG. 9 is a diagram showing SIP INVITE message example 2;

FIG. 10 is a diagram showing SIP INVITE message example 3;

FIG. 11 is a diagram showing SIP INVITE message example 4;

FIG. 12 is a diagram showing SIP 200 OK message example 1;

FIG. 13 is a diagram showing SIP 200 OK message example 2;

FIG. 14 is a diagram showing SIP 200 OK message example 3;

FIG. 15 is a diagram showing SIP 200 OK message example 4;

FIG. 19 shows an SIP message translation information table provided in the address translator 1;

FIG. 21 is a diagram showing an example of SIP message with a tag in the second and third embodiment of the present invention;

FIG. 25 shows an example of an SIP parameter list for translation in the present invention;

FIG. 26 is a table showing an exemplary SIP message translation rule in the present invention;

FIG. 31 shows a tag management table in the third embodiment of the present invention;

FIG. 32 shows a media information management table in the third embodiment of the present invention;

DESCRIPTION OF THE EMBODIMENTS

A first embodiment of the present invention will be described with reference to the accompanying drawings.

Figure 1:
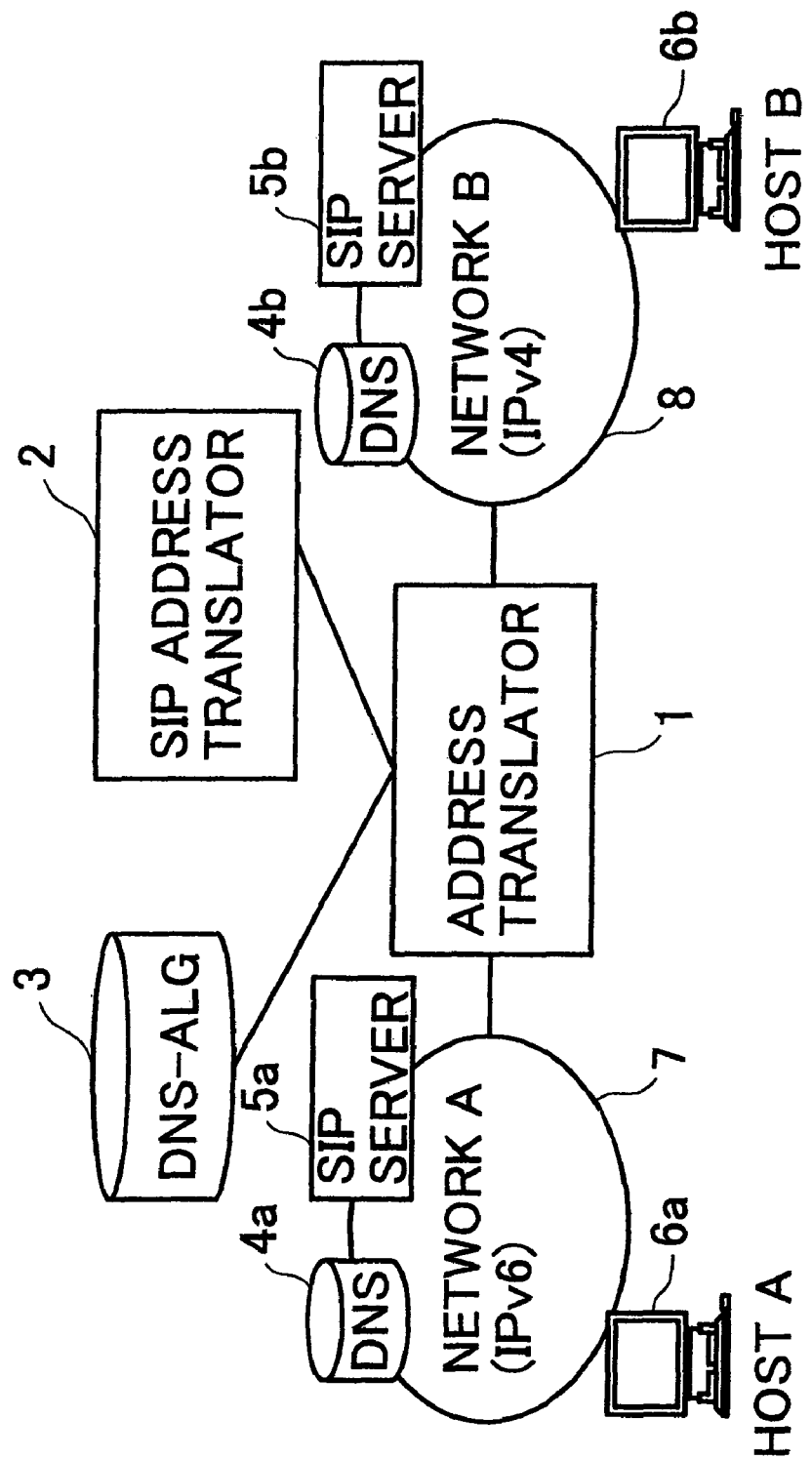
FIG. 1 is a schematic diagram illustrating an exemplary configuration of an SIP communication network in the present invention.

FIG. 1 illustrates an exemplary configuration of an SIP communication network according to the present invention. In the first embodiment, the SIP communication network is comprised of a network A7 and a network B8. Each SIP communication network comprises an SIP server 5, a terminal 6, and a DNS server 4. In this embodiment, the network A7 utilizes an IPv6 address. In this embodiment, the network B8 utilizes an IPv4 address. The network A7 and network B8 are interconnected through an address translator 1.

The address translator 1 comprises a function of translating the IPv6 address to the IPv4 address or vice versa; an SIP message detecting means; a means for communicating with an SIP address translator 2; and a means for communicating with DNS-ALG3.

The SIP address translator 2 comprises a means for managing information required for translating the address of an SIP message to rewrite the contents of the SIP message.

Figure 6:
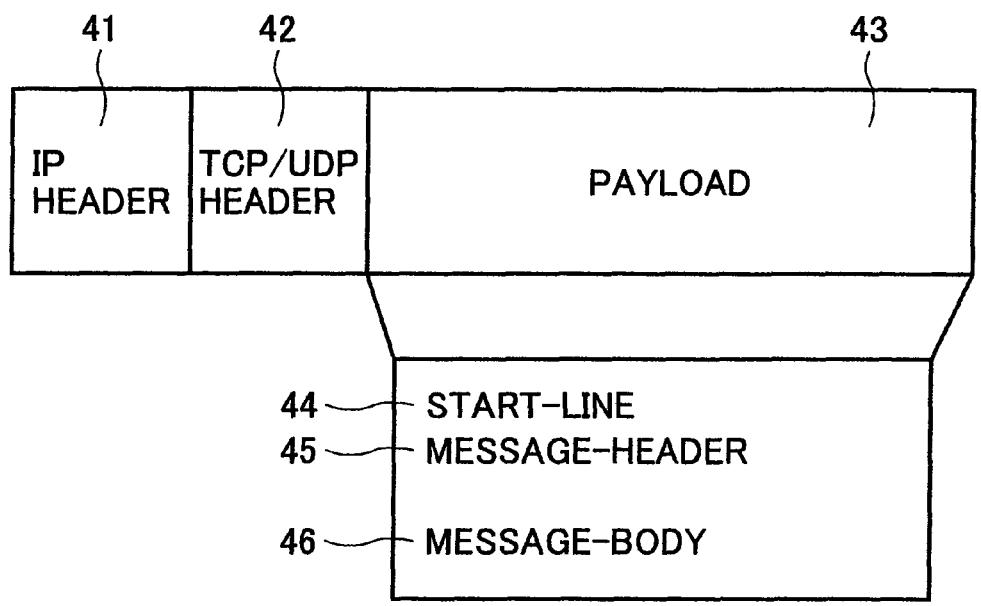
FIG. 6 is a diagram showing a format for an SIP message.

FIG. 6 shows a protocol stack and a message format for the SIP. A packet including the SIP is comprised of an IP header 41, a TCP/UDP header 42, and a payload 43. The SIP is stored in the payload 43. The SIP is comprised of a start-line 44, a message-header 45, and a message-body 46. The start-line 44 indicates the type and destination of an SIP message. The message-header 45 includes parameters associated with the SIP. The message-body 46 indicates information on a connection logically established between terminals. For description of the message-body, the SDP or the like may be utilized.

Figure 7:
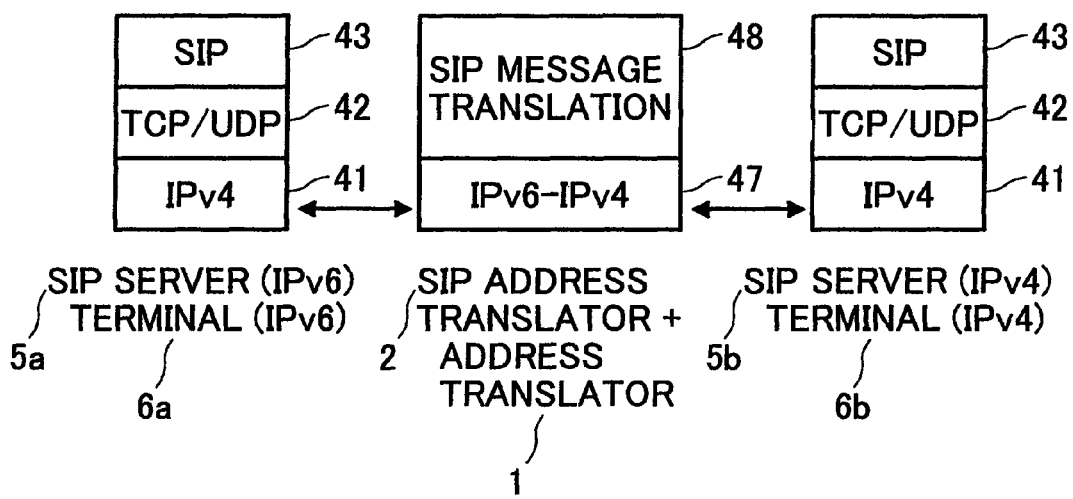
FIG. 7 is a diagram showing a protocol stack in the present invention.

FIG. 7 shows a protocol stack for an SIP communication between terminals which belong to different regions in accordance with the present invention. The SIP server 5 and terminal 6 comprise an SIP protocol stack (41, 42, 43) shown in FIG. 6. In this embodiment, the address translator 1 translates (47) the IP header 41, while the SIP address translator 2 translates (48) the SIP message 43.

Figure 2:
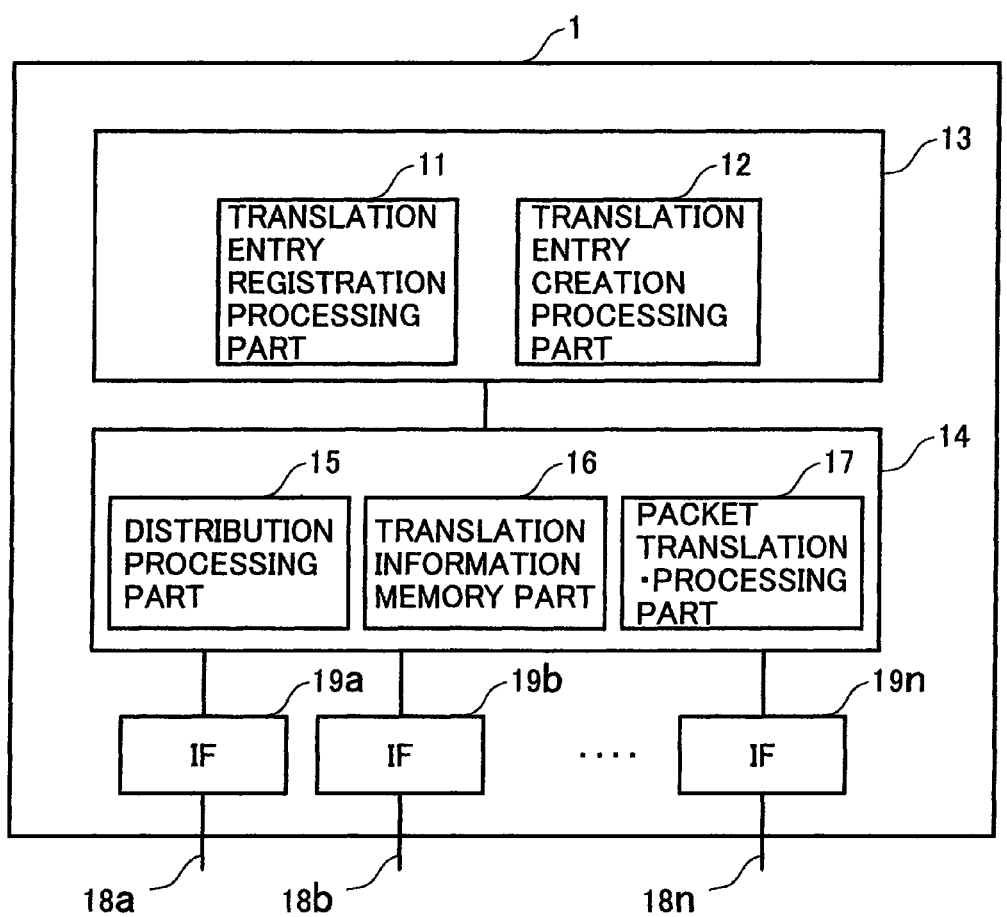
FIG. 2 is a block diagram of an address translator 1.

FIG. 2 illustrates an exemplary configuration of the address translator 1. The address translator 1 comprises interfaces (IF) (19a, 19b, 19n) which accommodate lines (18a, 18b, 18n), respectively, a packet transfer processing unit 14, and a packet transfer control unit 13.

The packet transfer processing unit 14 comprises a distribution processing part 15 for detecting an SIP message; a translation information memory part 16 for storing information required for translating an address; and a packet translation processing part 17 for translating a data packet. The translation information memory part 16 comprises a translation information table 500.

FIG. 19 shows an exemplary structure of the translation information table 500. The translation information table 500 stores a correspondence relationship between an IPv4 address 501 and an IPv6 address 502.

Turning back to FIG. 2, the description on the address translator 1 is continued. The distribution processing part 15 for detecting an SIP message detects an SIP message communicated between the network A7 and network B8 by any of the following means.

When an SIP message from the network A (network B) to the network B (network A) is directed to limited destinations, the address translator 1 detects the SIP message using a destination address in the packet header. The distribution processing part 15 of the address translator 1 stores information on the address of the destination of the SIP message.

The address translator 1 may detect an SIP message using a combination of a destination address and a destination port number in the packet header. When the TCP or UDP is used in a transport mechanism, a default port number of the SIP is set to 5060.

When an SIP message from the network A (network B) to the network B (network A) is directed to unlimited destinations, the address translator 1 detects the SIP message using a destination port number in the packet header. The distribution processing part 15 of the address translator 1 comprises information on a port number for use in the SIP communication.

Upon receipt of an IPv4 packet, the packet translation processing part 17 searches the translation information memory part 16 to rewrite an IPv4 address to an IPv6 address. On the other hand, upon receipt of an IPv6 packet, the packet translation processing part 17 searches the translation information memory part 16 to rewrite an IPv6 address to an IPv4 address. In this event, a variety of information may be rewritten in addition to the IP address.

Figure 4:
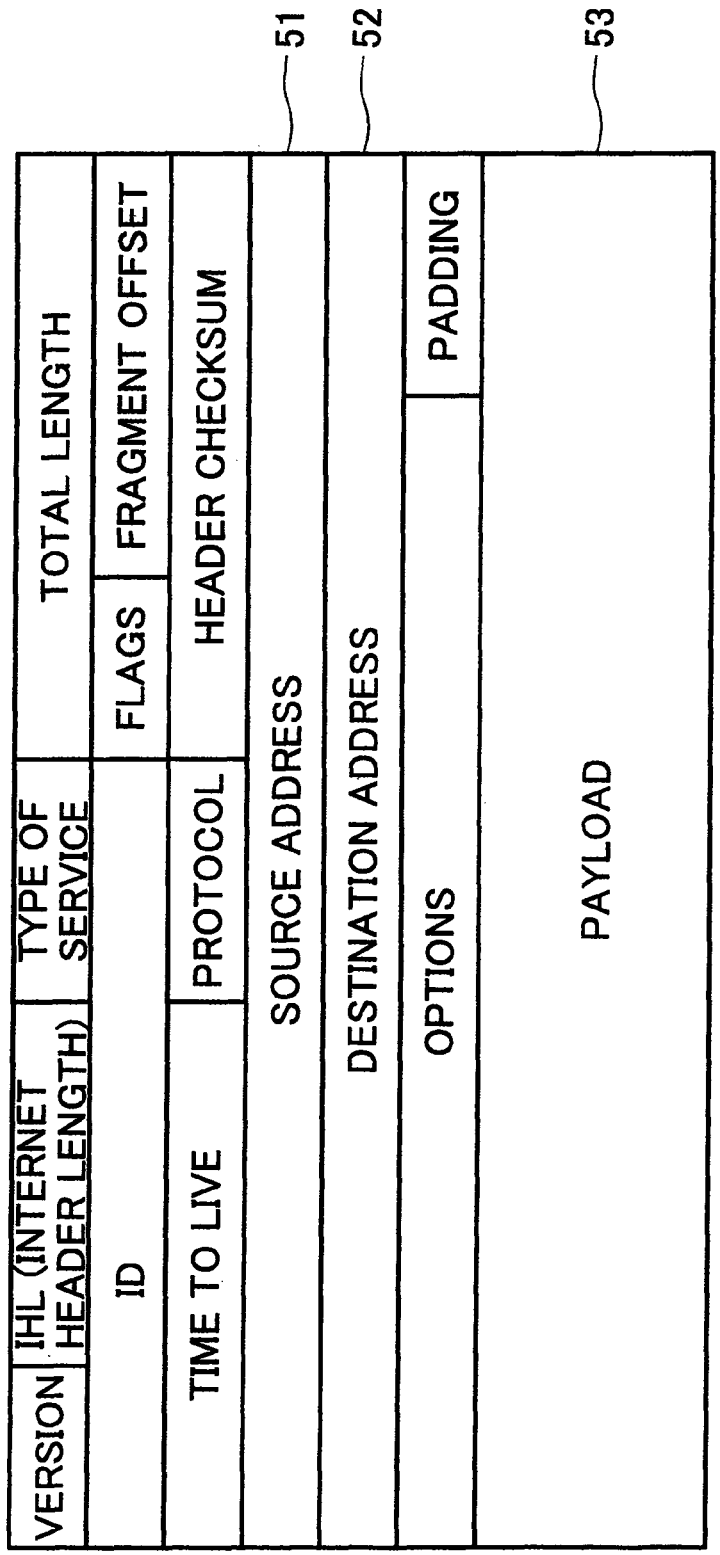
FIG. 4 is a diagram showing a format for an IPv4 packet.

FIG. 4 shows a format for the IPv4 packet.

Figure 5:
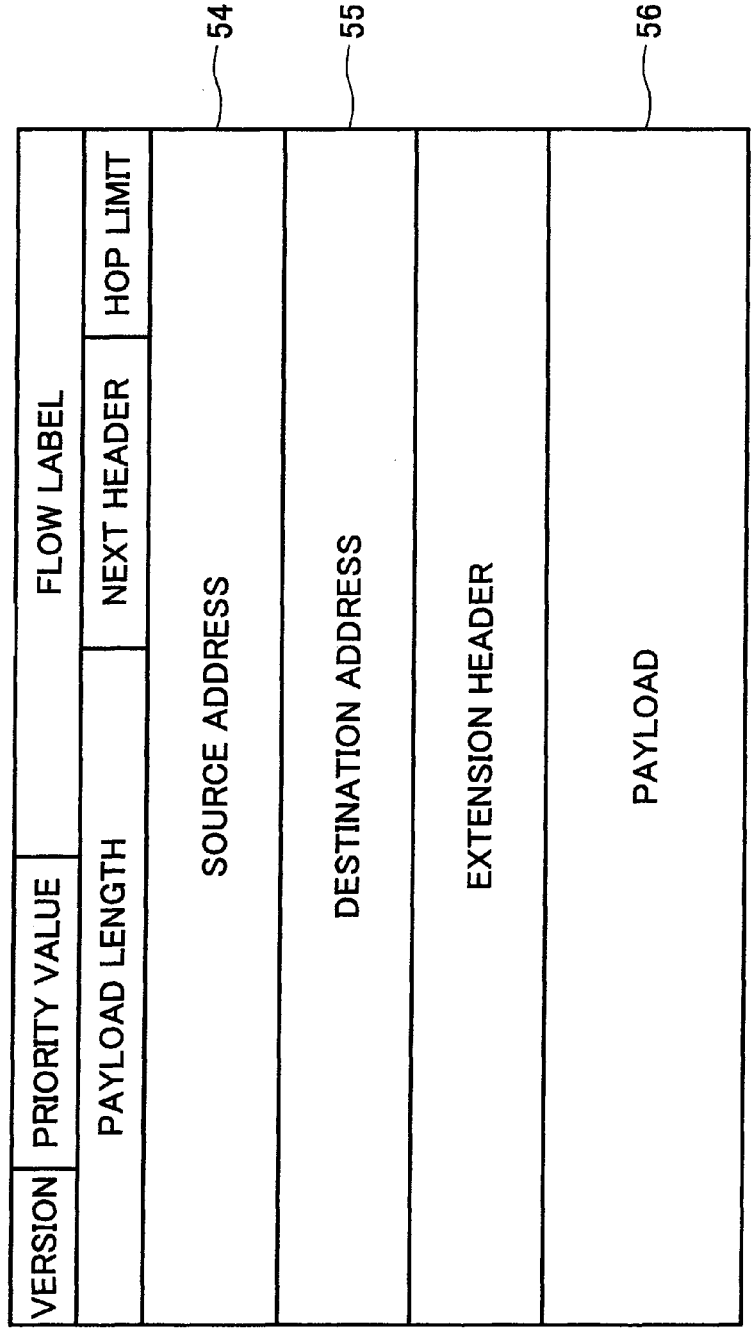
FIG. 5 is a diagram showing a format for an IPv6 packet.

FIG. 5 shows a format for the IPv6 packet. For the translation, this format is also translated, as well as the IP address.

Turning back to FIG. 2, the description on the address translator 1 is continued. The packet transfer control unit 13 comprises a translation entry registration processing part 11, and a translation entry creation processing part 12.

The translation entry registration processing unit 11 registers translation information in the translation information memory part 16.

The translation entry creation processing part 12 has a function of creating address translation information.

Figure 3:
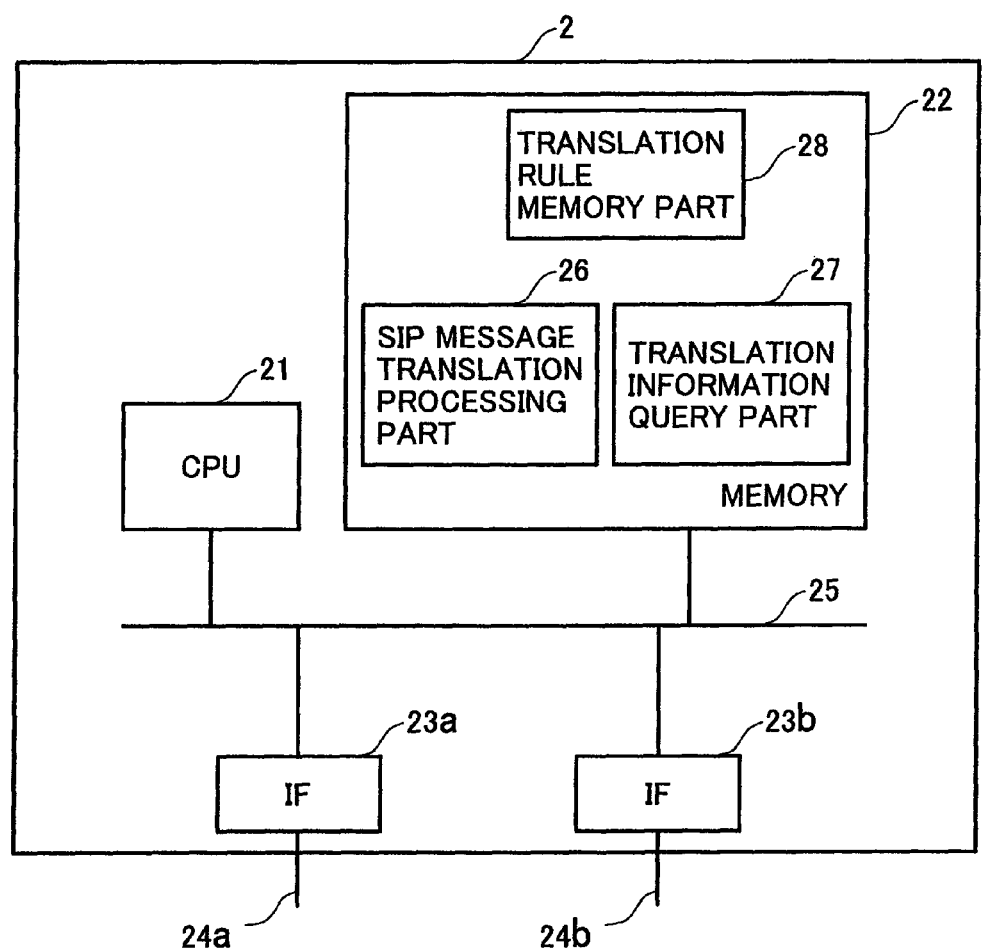
FIG. 3 is a block diagram of an SIP address translator 2.

FIG. 3 shows an exemplary configuration of the SIP address translator 2. The SIP address translator 2 comprises interfaces (IF) (23a, 23b) for accommodating lines (24a, 24b); a memory 22; a CPU 21; and a bus 25 which interconnects these components.

The memory 22 stores an SIP message translation processing program 26, a translation information query processing program 27, and a translation rule memory part 28.

Figure 18:
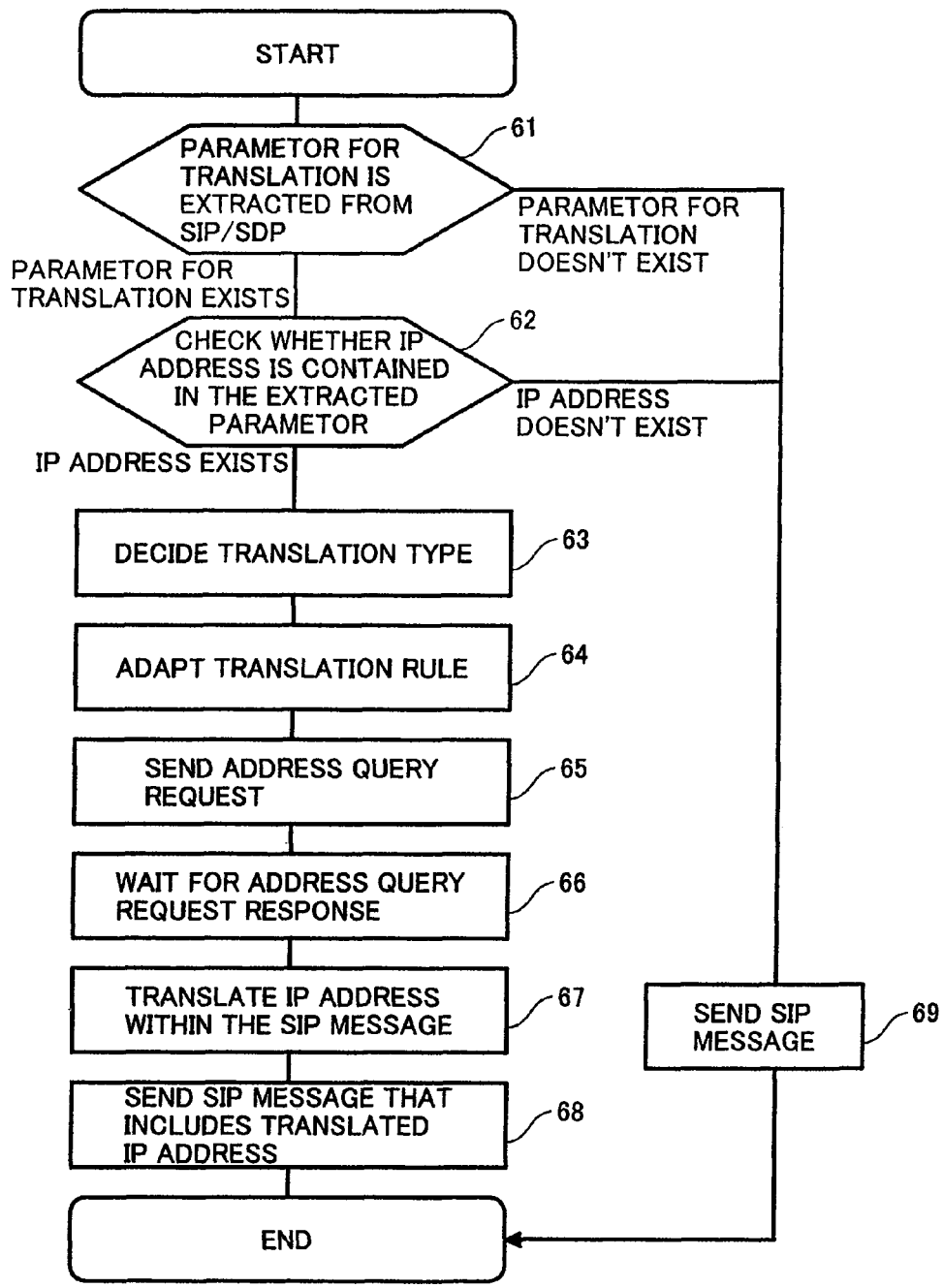
FIG. 18 is a flow chart illustrating an SIP message translation processing routine executed by an SIP address translator 2.

The SIP message translation processing part 26 includes a parameter information table 412 for translation shown in FIG. 25, and an SIP message processing routine 60 illustrated in FIG. 18, and translates address information included in an SIP message.

FIG. 25 shows the information table 412 which includes a parameter list for translation. This table defines parameters for the SIP and SDP which can set an IP address and a port number.

The translation rule memory part 28 stores a parameter translation rule for each of address translation scheme comprised in the address translator 1. An address included in an SIP message is translated in accordance with the associated translation rule.

FIG. 26 shows a translation rule 413 which is applied when the address translator 1 performs an address translation in accordance with the NAT-PT scheme. The faster translation processing can be accomplished by storing the translation rule 413 required for the SIP message translation in the memory.

The translation information query part 27 performs the processing involved in querying the address translator 1 as to IP address translation information.

Description will now be made on an SIP-based audio communication between the terminal 6a in the network A and the terminal 6b in the network B in FIG. 1 in accordance with sequences shown in FIGS. 27, 28, 29. Upon starting a communication, a session must be established between the terminal 6a and terminal 6b.

Assume herein that the SIP server 5a has been set in the terminal 6a as a destination of an SIP message.

The terminal 6a sends an SIP message (INVITE) for requesting the establishment of a session between itself and the terminal 6b to the SIP server 5a (101).

FIG. 8 shows an example 401 of the SIP message (INVITE) sent by the terminal 6a to the SIP server 5a. Information on the destination of the SIP message (INVITE) is set in the start-line. A "Via:" header indicates a route of the SIP message (INVITE). A response to the SIP message (INVITE) is sent from a destination terminal to the originating terminal based on the "Via:" header information. A "To:" header indicates the destination of the SIP message (INVITE); A "From:" header indicates the initiator of the SIP message (INVITE); and a "Call-ID:" header indicates a call identifier, respectively. A c-parameter in the message body indicates connection information; and an m-parameter indicates a port number through which data is received, respectively. After establishing the session, audio information between the terminals is sent to a destination indicated by the c-parameter and m-parameter.

Turning back to FIG. 27, the description on the sequence is continued. Upon receipt of the SIP message (INVITE), the SIP server 5a determines the destination of the SIP message (INVITE) from the destination information in the start-line. When a domain name is set as the destination information, the SIP server 5a sends a DNS query to the DNS server 4a (102). The DNS server 4a solves the name of the SIP server 5a in association with the DNS-ALG3 and DNS server 4b (103). For associating the address translator (TR) 1 with the DNS-ALG3, an address translation scheme is applied, for example, as described in JP-A-2001-274419. The DNS-ALG3 translates an IPv4 address b4 associated with the domain name of the SIP server 5b to a virtual IPv6 address vb6. The translation information is stored in the translation information table 500 in the translation information memory part 16 in the address translator 1.

The SIP server 5a acquires the virtual IPv6 address vb6 of the SIP server 5b as information on the destination of the SIP message (INVITE) (104), and sends the SIP message (INVITE) to the virtual IPv6 address vb6 (105).

FIG. 9 shows an example of the SIP message (INVITE) sent by the SIP server 5a.

The address translator 1 detects the SIP message (INVITE) based on the IP address, or a combination of the IP address and port number, or the port number (106). The address translator 1 sends the SIP message (INVITE) detected together with the information indicative of an address translation scheme to the SIP address translator (SIP-ALG) 2 (107). When there is only one address translation scheme for the address translator 1, information on the address translation scheme may be previously stored in the SIP address translator 2.

Upon receipt of the SIP message (INVITE), the SIP address translator 2 initiates an SIP message translation processing routine 60 illustrated in FIG. 18 (108).

FIG. 18 illustrates the SIP message translation processing routine 60 in the first embodiment. The SIP address translator 2 compares the parameter list 412 for translation with the received SIP message to extract parameters to be translated (61).

When there is a parameter for translation, the SIP address translator 2 checks whether or not the extracted parameter includes an IP address (62).

When the extracted parameter includes an IP address, the SIP address translator 2 decides an address translation scheme (63). Next, the SIP address translator 2 identifies IP addresses for translation with reference to the translation rule 413 in the translation rule memory part 28 (64). For example, IP addresses to be translated when receiving the SIP message (INVITE) shown in FIG. 9 are the IPv6 address sipa6 of the SIP server 5a, and the IPv6 address a6 of the terminal 6a.

When the address translation scheme associated with the address translator 1 is an IP masquerade, a port number included in the parameter is also to be translated. The IP masquerade is a scheme which translates a port number of TCP/UDP in addition to the IP address.

The translation information query part 27 in the SIP address translator 2 sends an address query request 600 including the IP addresses "sipa6, a6" for translation to the address translator 1 (65, 109).

Figure 16:
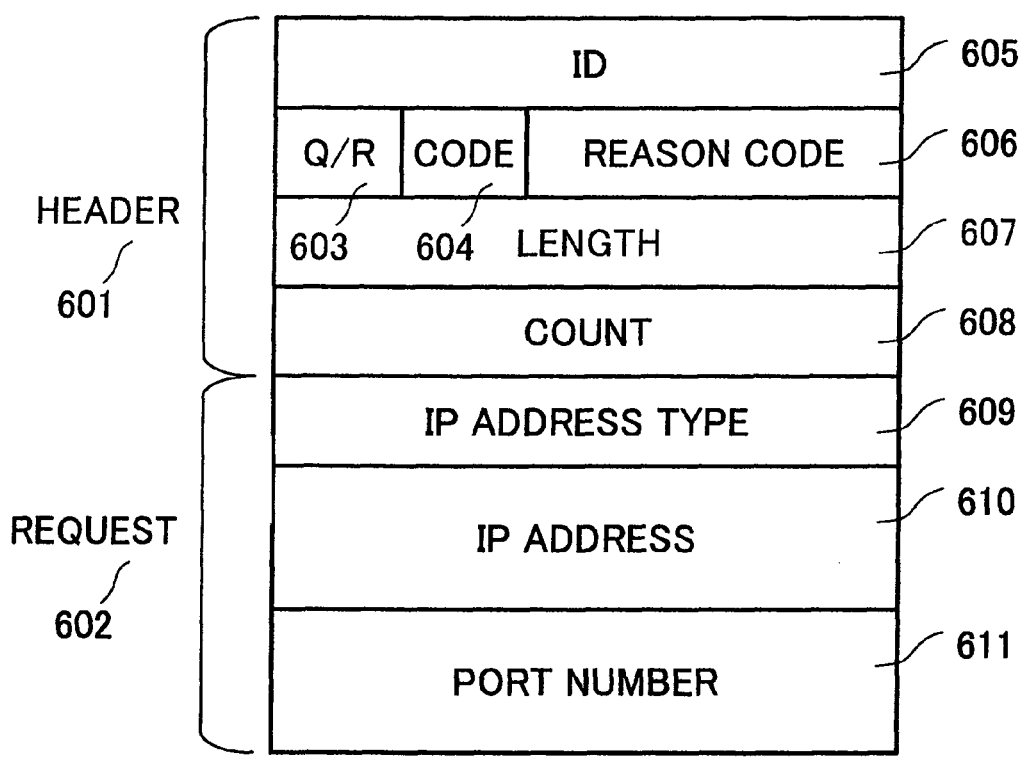
FIG. 16 is a diagram showing a message format for an address query request.

FIG. 16 shows a message format for the address query request 600. The address query request is comprised of a header 601 and a request content 602. The header 601 includes an ID (605) for associating the address query request with a response thereto. A count (608) sets the number of IP addresses for translation.

The request content 602 includes, for each IP address for translation, an IP address type (IPv4, IPv6) (609), an IP address for translation (610), and a port number for translation (611). The port number 611 is set when the translation scheme is the IP masquerade.

The address translator 1 receives the address query request 600, and searches the translation information table 500 in the translation entry creation processing part 12 using the IP address for translation.

When the IP address for translation exists in the translation information table 500 of the translation entry creation processing part 12, the address translator 1 sends an address query request response (110, 66) including the translated IP address to the SIP address translator 2.

When the IP address for translation does not exist in the translation information table 500 of the translation entry creation processing unit 12, the address translator 1 initiates the translation entry registration processing part 11 to set a translation entry in the translation information table 500 of the translation information memory part 16. The address translator 1 sends an address query request response (110, 66) including the translated IP addresses (vsipa4, va4) to the SIP address translator 2.

Figure 17:
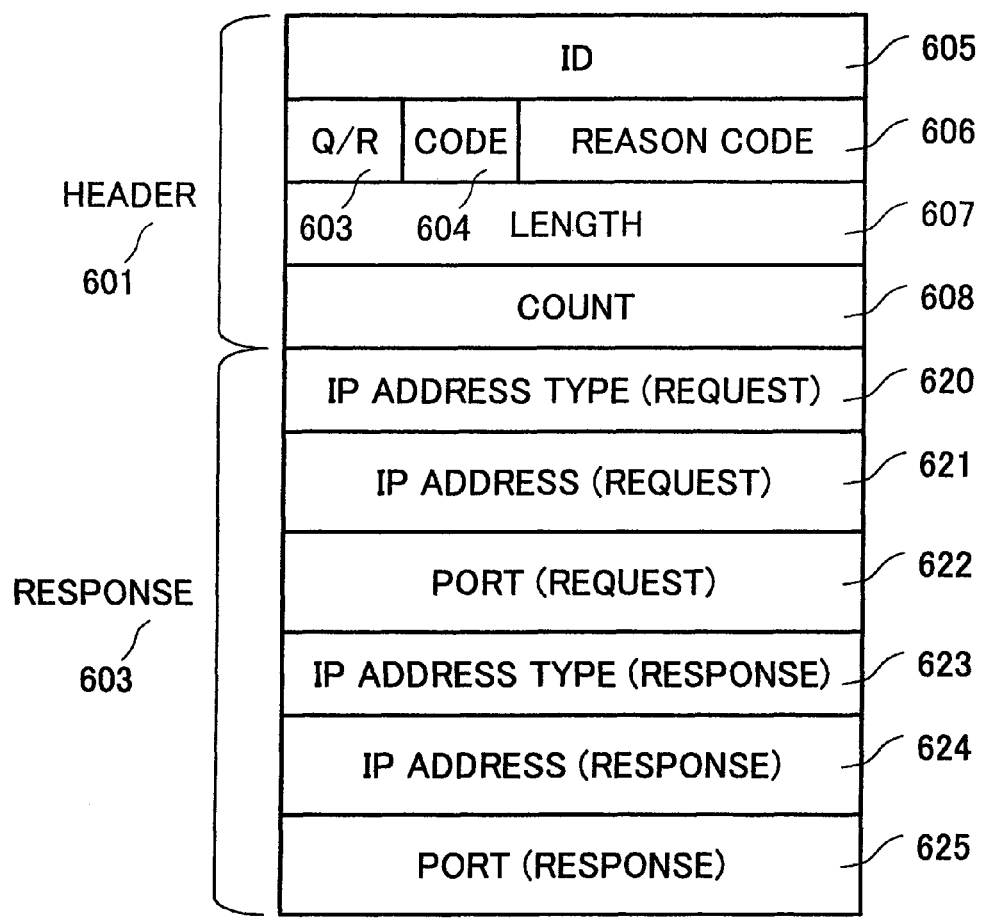
FIG. 17 is a diagram showing a message format for an response to the address query request.

FIG. 17 shows a message format for the address query request response 650. The address query request response is comprised of a header 601 and a response content 603. The response content 603 includes a combination of an IP address type (620), an IP address (621) and a port number (622) for translation, and a translated IP address type (623), IP address (624) and port number (625).

The SIP address translator 2 receives the address query request response, and rewrites the IP address information included in the SIP message (67, 111). More specifically, the SIP address translator 2 rewrites sipa6 to vsipa4, and a6 to va4, respectively.

The SIP address translator 2 sends the SIP message (INVITE) which has the rewritten IP address information to the address translator 1, followed by termination of this routine (68, 112).

When no parameter for translation is extracted at step 61, and when no IP address information is included in the extracted parameter at step 62, the SIP address translator 2 does not rewrite the SIP message. The SIP address translator 2 sends the SIP message to the address translator 1 (69), followed by termination of this routine.

Turning back to FIG. 27, the description on the sequence diagram is continued. Upon receipt of the SIP message (INVITE) from the SIP address translator 2 (112), the address translator 1 translates the address in the IP packet header including the SIP message (INVITE) (113). Referring to the translation information table 500 in the translation information memory part 16, the address translator 1 translates the destination address to the real IPv4 address "sipb4" of the SIP server 5b, and the source address to the virtual IPv4 address "vsipa4" of the SIP server 5a, respectively.

FIG. 10 shows an example of the SIP message (INVITE).
FIG. 11 shows an example of the SIP message (INVITE).
The SIP server 5b receives the SIP message (INVITE) shown in FIG. 10 (114). In FIG. 10, the IP addresses set in the via header, Call-ID header, contact header and c-parameter have been translated from IPv6 to IPv4, as compared with the exemplary SIP message before the translation shown in FIG. 9.

The SIP server 5b identifies position information on the destination terminal 6b from destination information in the start-line, and sends the SIP message (INVITE) shown in FIG. 11 to the terminal 6b (115).

For permitting the SIP message (INVITE), the terminal 6b responds with an SIP message (200 OK). Audio information sent by the terminal 6b to the terminal 6a is sent to an IP address specified by the c-parameter in the SIP message (INVITE) (the virtual IPv4 address "va4" of the terminal 6a), and to a port address specified by the m-parameter.

The SIP message (200 OK) is sent to the terminal 6a through the SIP server which has processed the SIP message (INVITE) based on the information in the via header. The SIP message (200 OK) is a response to the SIP message (INVITE).

FIG. 12 is an example 1 of the SIP message (200 OK).
FIG. 13 is an example 2 of the SIP message (200 OK).

Figure 27:
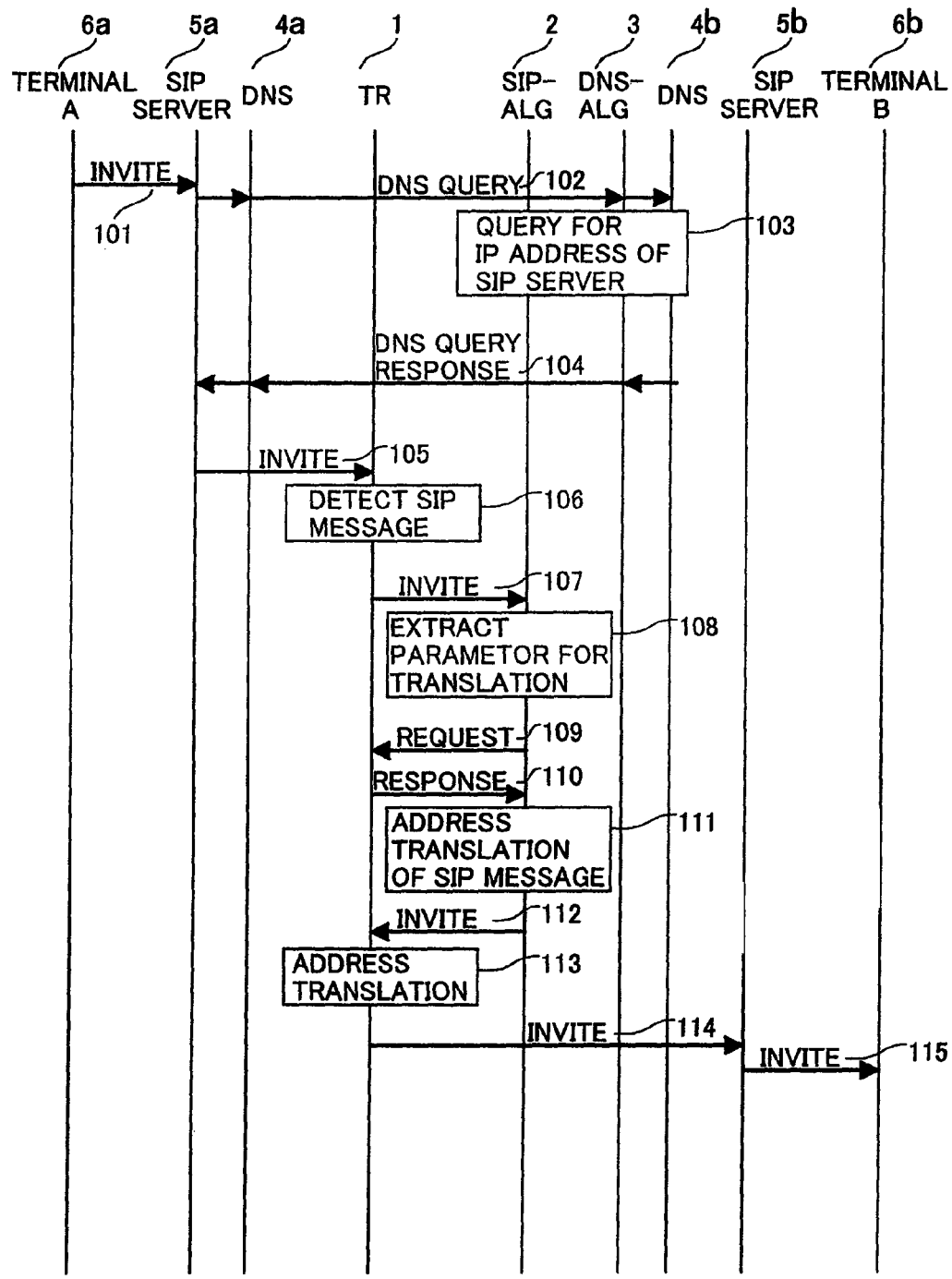
FIG. 27 is an SIP communication sequence diagram 1 in the present invention.
Figure 28:
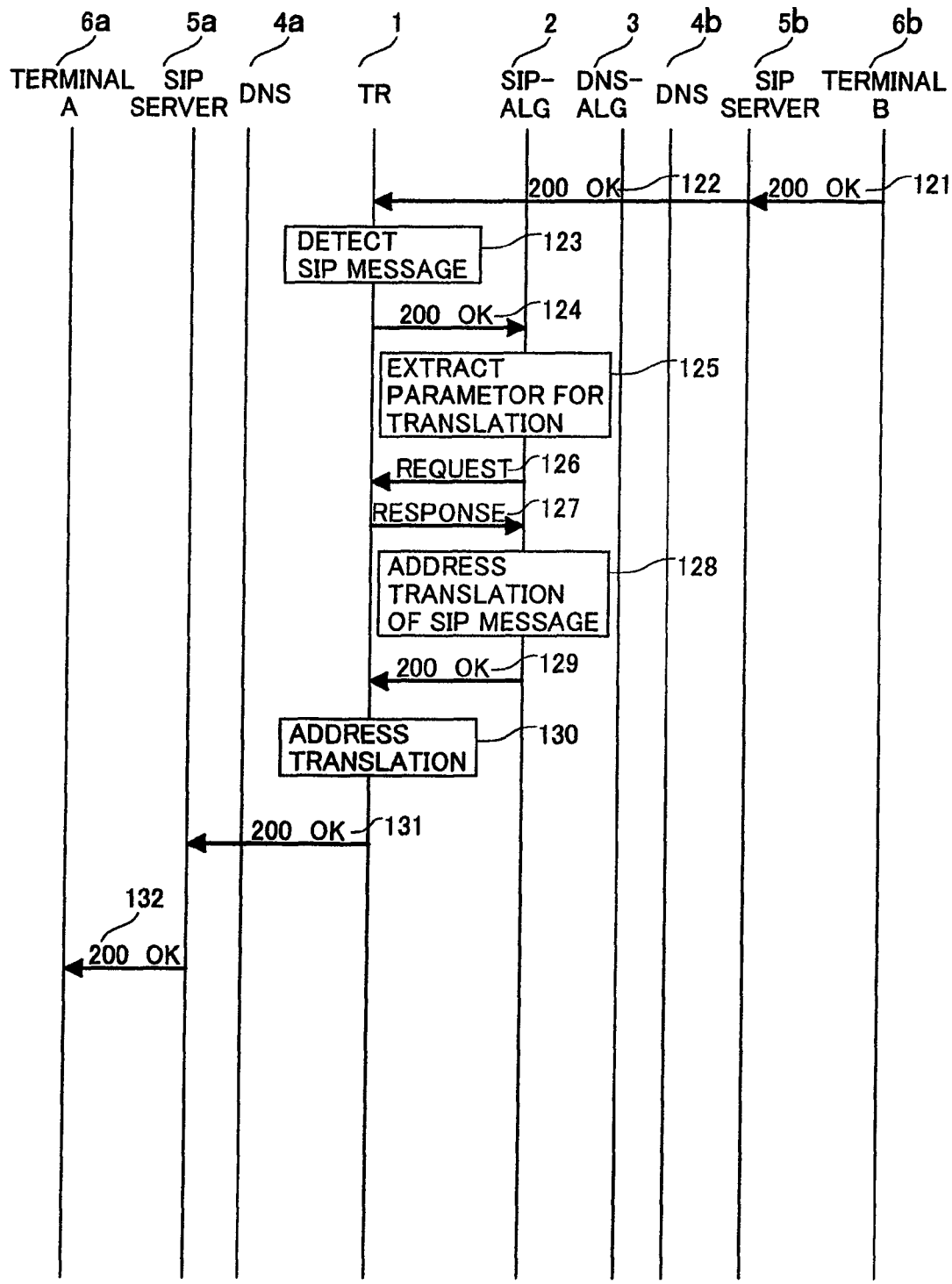
FIG. 28 is an SIP communication sequence diagram 2 in the present invention.

Continued on FIG. 28, the SIP server 5b receives the SIP message (200 OK) shown in FIG. 12 from the terminal 6b (121). The SIP server 5b sends the SIP message (200 OK) shown in FIG. 13 to the virtual IPv4 address "vsipa4" of the SIP server 5a (122). The address translator 1 detects the SIP message (200 OK) (123), and sends the SIP message (200 OK) to the SIP address translator 2 (124). Upon receipt of the SIP message (200 OK), the SIP address translator 2 initiates the SIP message translation processing routine 60. The flow of the SIP message translation processing (from 125 to 128) is similar to steps 108 to 111 in FIG. 27. The SIP address translator 2 sends an address query request which has "vsipa4, va4, b4" set in the IP addresses for translation to the address translator 1 (126). The address translator 1 searches the translation information table 500 in the translation entry creation processing part 12 using the IP addresses for translation to detect translation entries of "vsipa4-sipa6" and "va4-a6" which have been created upon receipt of the address query request at step 109. The address translator 1 creates a virtual IPv6 address "vb6" for "b4" and stores the virtual IPv6 address in the translation information table 500 in the translation information memory part 16. The address translator 1 sends an address query request response including a combination of the IP addresses for translation and the translated IP addresses to the SIP address translator 2 (127).

FIG. 14 shows an example 3 of the SIP message (200 OK).
FIG. 15 shows an example 4 of the SIP message (200 OK).

The SIP address translator 2 rewrites the IP address information, and sends the SIP message (200 OK) to the address translator 1 (128, 129). The address translator 1 performs an address translation for the IP packet header including the SIP message (200 OK) (130). Referring to the translation information table 500 in the translation information memory part 16, the address translator 1 translates the destination address to the real IPv6 address "sipa6" of the SIP server 5a, and the source address to the virtual IPv6 address "vsipb6" of the SIP server 5b, respectively. The address translator 1 sends the SIP message (200 OK) shown in FIG. 14 to the SIP server 5a (131). The SIP server 5a sends the SIP message (200 OK) shown in FIG. 15 to the terminal 6a (132).

Audio information sent by the terminal 6a to the terminal 6b is sent to the IP address (virtual IPv4 address "vb6" of the terminal 6b) specified by the c-parameter of the SIP message (200 OK), and to the port number specified by the m-parameter.

Figure 29:
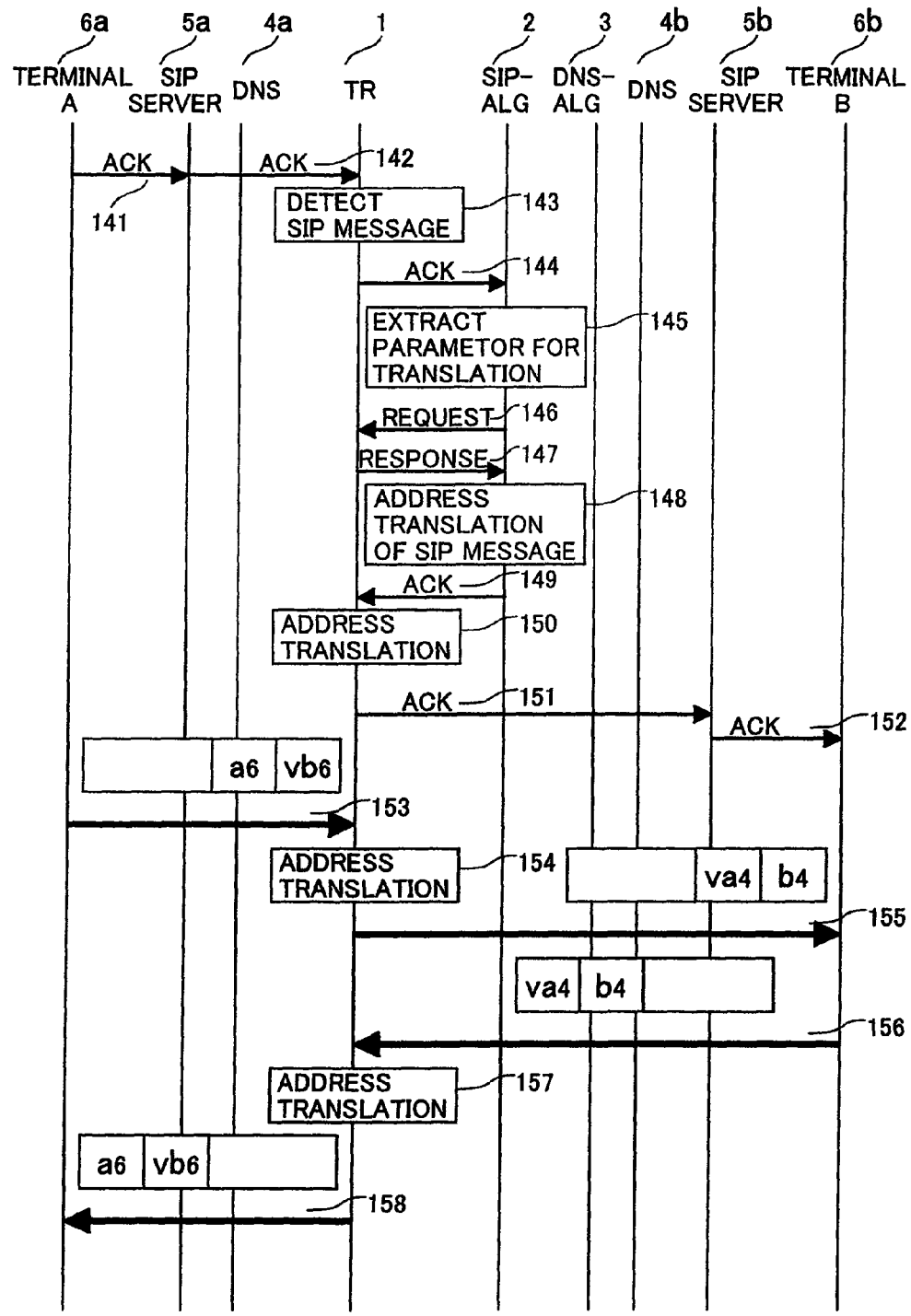
FIG. 29 is an SIP communication sequence diagram 3 in the present invention.

Continued on FIG. 29, upon receipt of the SIP message (200 OK) which is a response to the SIP message (INVITE), the terminal 6a sends an SIP message (ACK) to the SIP server 5a (141). The SIP server 5a sends the SIP message (ACK) to the virtual IPv4 address "vsipb6" of the SIP server 5b (142). The address translator 1 detects the SIP message (ACK) (143), and sends the SIP message (ACK) to the SIP address translator 2 (144).

The flow of the SIP message translation processing (from 145 to 148) is similar to steps 108 to 111 in FIG. 27. The SIP address translator 2 sends the SIP message (ACK) in which the IP address information has been rewritten to the address translator 1 (149). The address translator 1 translates the address of the IP packet header including the SIP message (ACK) (150). The address translator 1 sends the SIP message (ACK) to the real IPv4 address "sipb4" of the SIP server 5b (151). The SIP server 5b sends the SIP message (ACK) to the terminal 6b (152).

The foregoing procedure results in a logical connection established between the terminal 6a and terminal 6b, thereby permitting an audio communication between the terminals. The terminal 6a sends a packet including audio information to the virtual IPv6 address (vb6) corresponding to the IPv4 address of the terminal 6b (153). The address translator 1 searches the translation information memory part 16 using the source IP address "a6" and destination IP address "vb6." Consequently, the translation entries registered at step 109 and step 126 in the aforementioned processing sequence are detected.

The address translator 1 rewrites the header information based on the translation entries (154). The virtual IPv4 address "va4" corresponding to the IPv6 address "a6" of the terminal 6a is set to the original IP address. The real IPv4 address "b4" of the terminal 6b is set to the destination IP address. The address translator 1 sends the packet with the translated header information to the terminal 6b (155).

A packet including audio information sent from the terminal 6b to the terminal 6a is processed in a similar manner (156-158).

According to the first embodiment of the present invention, an IP address in an SIP message can be translated using information on the address translator. It is therefore possible to perform SIP communications between terminals which belong to different regions.

Next, a second embodiment of the present invention will be described with reference to the accompanying drawings.

The first embodiment differs from the second embodiment in a method of implementing functions of the SIP message translating means.

In the second embodiment, the address translator 1 comprises a function of detecting parameters for translation in an SIP message.

Figure 20:
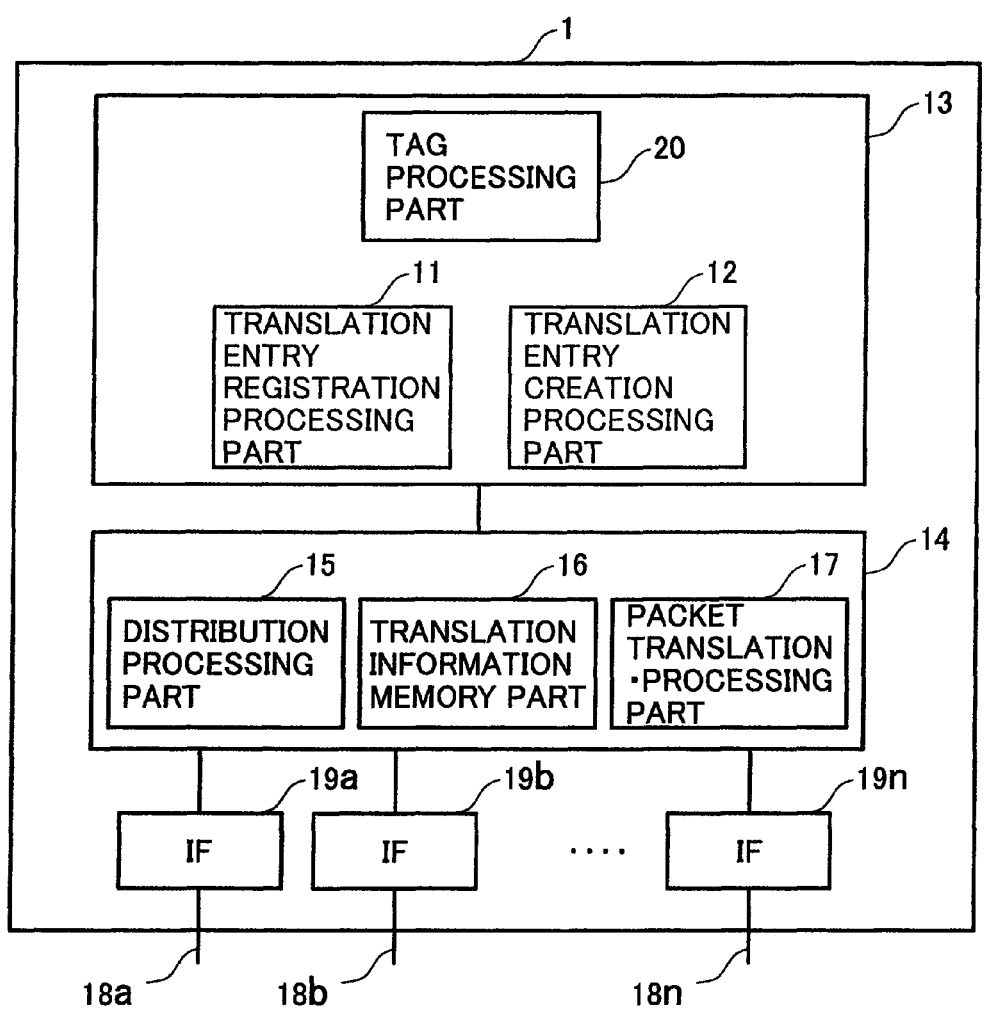
FIG. 20 is a block diagram of an address translator 1 in a second and a third embodiment of the present invention.

FIG. 20 illustrates an exemplary configuration of the address translator 1 in the second embodiment. The address translator 1 in the second embodiment comprises a tag processing part 20 in the packet transfer control unit 13, in addition to the exemplary configuration in FIG. 2.

Figure 22:
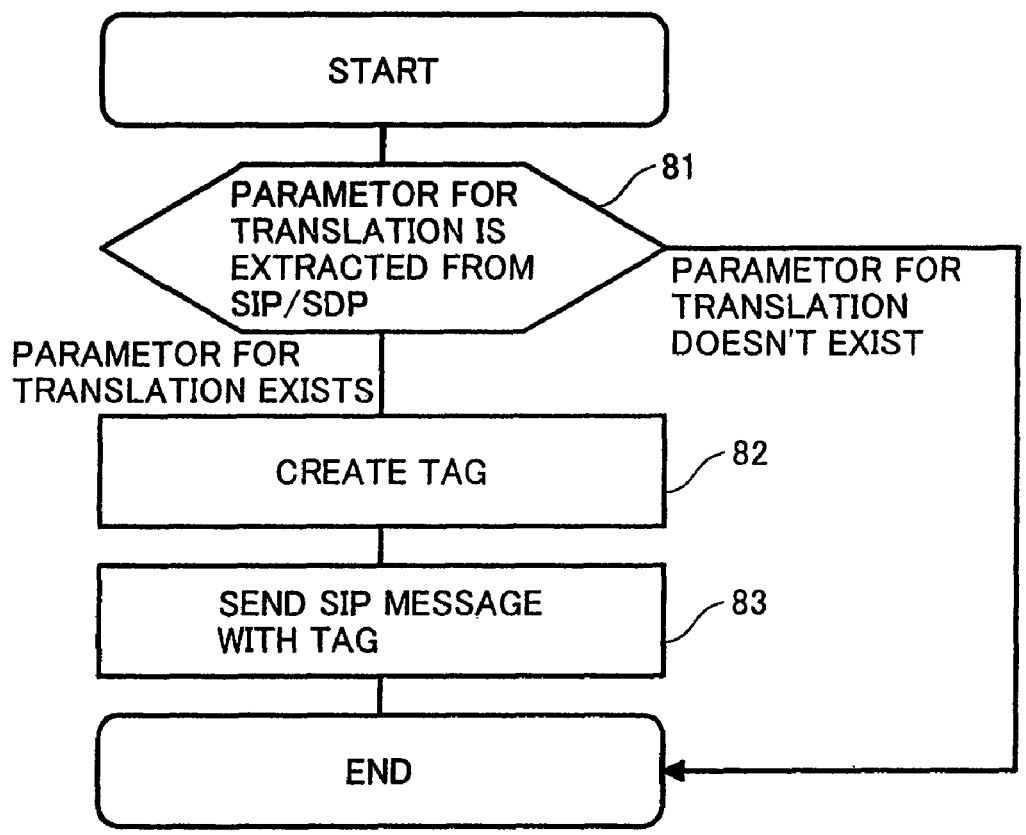
FIG. 22 is a flow chart illustrating a tag addition processing routine in the address translator 1 in the second embodiment of the present invention.

The tag processing part 20 comprises the parameter list 412 for translation shown in FIG. 25, and a tag addition processing routine 80 illustrated in FIG. 22. Upon detection of an SIP message, the address translator 1 initiates the tag addition processing routine 80.

FIG. 22 illustrates the tag addition processing routine 80 executed by the address translator 1. The address translator 1 compares the parameter list 412 for translation with the received SIP message to extract parameters for translation (81). When parameters for translation exist in the SIP message, the address translator 1 creates identification information (tag) which is added to the detected parameters (82). The tag is comprised of the address translation scheme provided by the address translator 1, and an identifier. The address translator 1 sends the SIP message with the identification information added thereto to the SIP address translator 2 (83), followed by termination of this routine.

FIG. 21 shows an example of SIP message 401 with tag which is sent by the address translator 1 to the SIP address translator 2. From a comparison with FIG. 8, it can be seen that the tag is added to the head of a row for translation.

When no parameters for translation exist at step 81, this routine is terminated. When there are no parameters for translation, the address translator translates the address information in the IP packet header including the received SIP message, and transfers the SIP message. The contents of the SIP are not translated.

In the second embodiment, the SIP address translator 2 comprises an SIP message translation processing routine 70 in the SIP message translation processing part 26.

Figure 23:
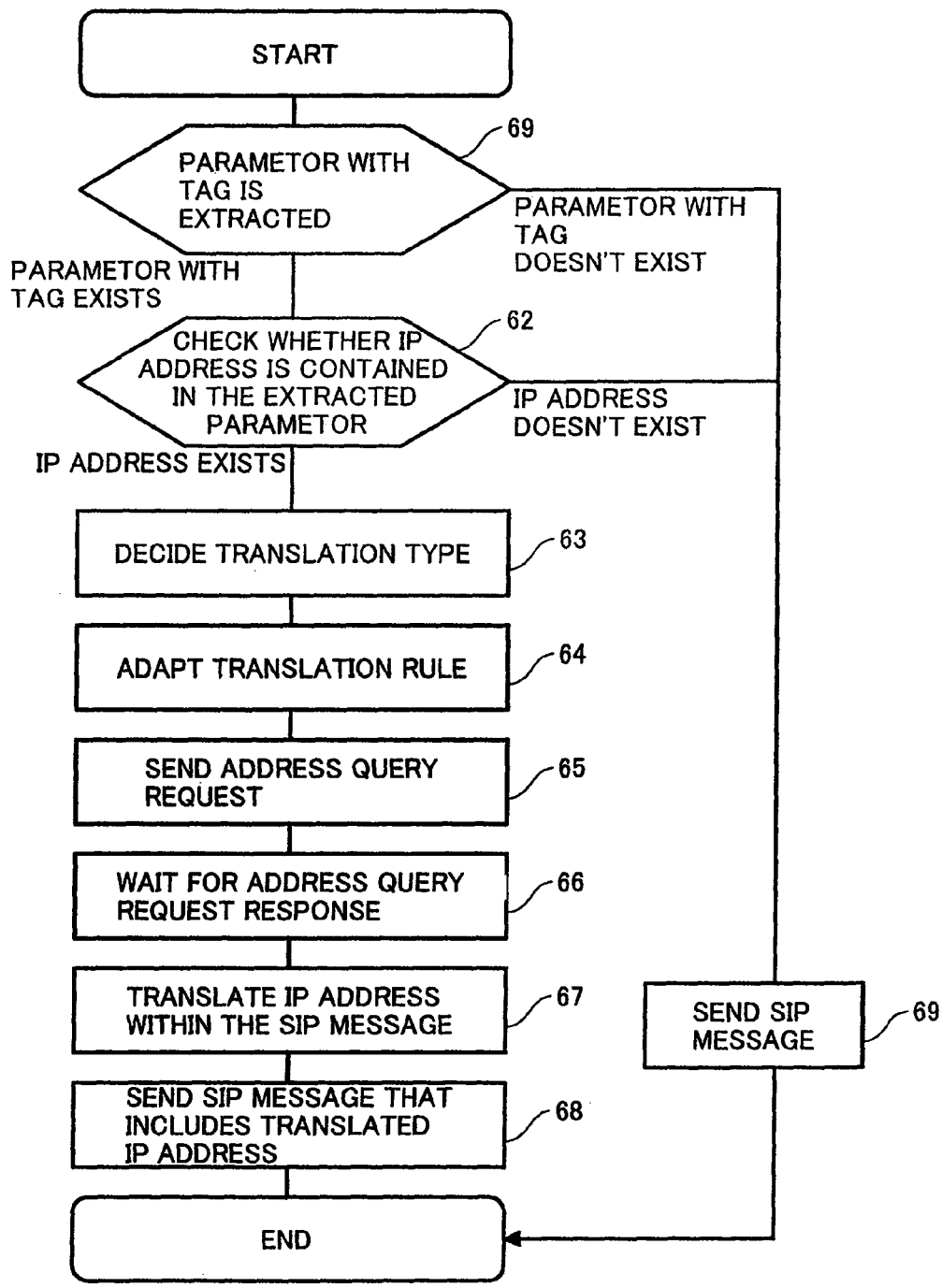
FIG. 23 is a flow chart illustrating an SIP message translation processing routine in an SIP address translator 2 in the second and third embodiment of the present invention.

FIG. 23 shows the SIP message translation processing routine 70 which is initiated when the SIP address translator 2 receives an SIP message with tag in the second embodiment.

The SIP message translation processing routine 70 in FIG. 23 differs from the SIP message translation processing routine 60 in the first embodiment in that step 61 is replaced with step 69 at which a parameter with tag is extracted. At step 69, a parameter with tag is extracted from a received SIP message.

According to the second embodiment, since the address translator 1 has a function of detecting parameters for translation in the SIP message, the SIP address translator 2 is burdened with a less processing load. Also, when no parameters for translation is included in a received SIP message, the address translator 1 can transfer the SIP message without starting the SIP address translator 2.

Next, a third embodiment of the present invention will be described with reference to the accompanying drawings.

The third embodiment is characterized in that the tag information in the second embodiment is corresponded to "call leg" of the SIP communication defined in RFC2543. RFC2543 defines that the call leg indicates a peer to peer SIP relationship.

The call leg can be uniquely identified by a combination of the "To:" header, "From:" header, and "Call-ID:" header. These headers are included in all SIP messages.

The address translator 1 in the third embodiment further comprises, in addition to the address translator 1 of the second embodiment, table information 300 for managing a correspondence relationship between the tag and call leg; table information 310 for managing a correspondence relationship between the tag and media information; and method information indicative of the start of an SIP session and the end of the SIP session. A method of the SIP indicative of a request for terminating an SIP session may be, for example, BYE. The method of the SIP indicates the type of an SIP message.

Also, tag information is added to each entry of the translation information table 500 provided in the translation entry creation processing part 12 of the address translator 1.

In the third embodiment, the SIP address translator 2 sets the tag information in an ID of an address query request 600 which is sent to the address translator 1. When the address translator creates a translation entry, the tag information is stored in the translation information table 500.

Generally, a request for terminating an SIP session does not include the message-body. However, for providing a more detailed SIP communication, it is desired that the address translator 1 deletes address translation information for the SIP session, when this SIP session terminates.

The third embodiment is characterized in that the address translator 1 has the information on the correspondence between the call leg and tag, so that the associated translation information is deleted at the end of an SIP session, without providing a session state management function in the SIP address translator 2.

FIG. 31 shows a tag management table 300 provided in the tag processing part 20 of the address translator 1 in the third embodiment. Each entry in the tag management table 300 defines a tag (301); IPv6 To header (302); IPv6 From header (303); IPv6 Call-ID (304); IPv4 To header (305); IPv4 From header (306); and IPv4 Call-ID (307).

Since IP address information can be set in the To header, From header and Call-ID header, entries on the IPv6 side and IPv4 side are defined.

FIG. 32 shows a media information management table 310 provided in the translation entry creation processing part 12 of the address translator 1 in the third embodiment. Each entry in the media information management table 310 defines a tag (311); an IPv6-side c-parameter (312); an IPv6-side m-parameter (313); an IPv4-side c-parameter (314); and an IPv4-side m-parameter (315). With the provision of the media information management table 310, the address translator 1 blocks audio information after termination of an SIP session.

Figure 30:
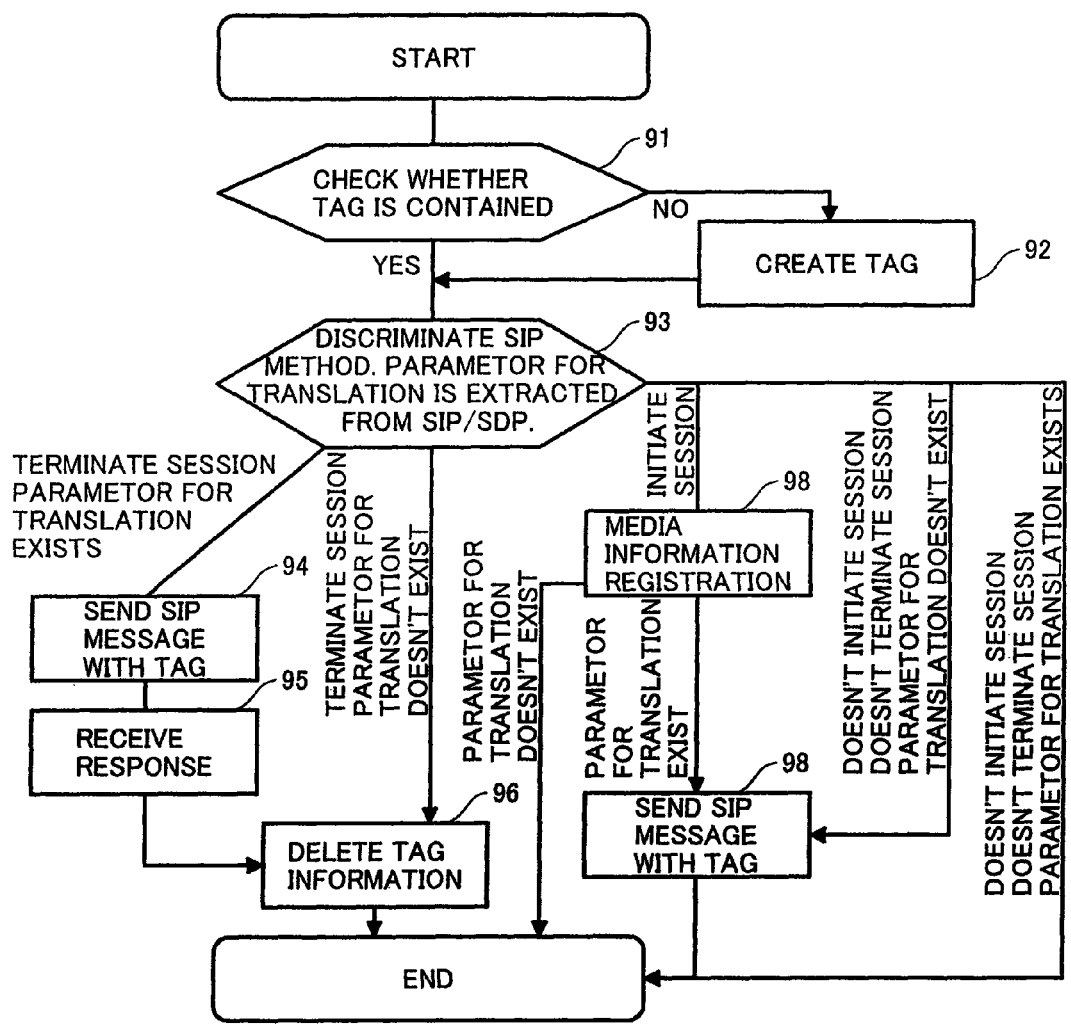
FIG. 30 is a flow chart illustrating a tag addition processing routine in the address translator 1 in the third embodiment of the present invention.

FIG. 30 illustrates a tag addition processing routine 90 provided in the address translator 1 in the third embodiment. Upon detection of an SIP message, the address translator 1 searches the tag management table 300 (91). A search key is call leg information in the received SIP message.

When no entry exists, a tag is created (92).

The address translator 1 references the method information indicative of the start of the SIP session and the end of the SIP session, and the parameter list for translation 412 to perform processing suitable for the received message (93).

When the SIP message indicates the end of the session and the SIP message includes parameters for translation, the address translator 1 sends the SIP message with tag information added thereto to the SIP address translator 2 (94). The address translator 1 receives the SIP message, in which the parameters have been rewritten, from the SIP address translator 2 (95). Here, the address translator 1 deletes a translation entry associated with the tag included in the translation information table 500 of the translation entry creation processing part 12, and an entry associated with the tag included in the media information management table 310. Further, the translation entry registration processing part 11 requests the translation information memory part 16 to delete associated entries. When the deletion is normally performed, this routine is terminated (96).

When the SIP message indicates the end of the SIP session and the SIP message includes no parameters for translation, the address translator 1 executes the foregoing step 96.

When the SIP message indicates the start of the SIP session, the address translator 1 registers information on a correspondence between the tag and the c-parameter and m-parameter in the media information management table 310 (97). When the SIP message includes parameters for translation, the address translator 1 sends the SIP message with tag information added thereto to the SIP address translator 2 (98), followed by termination of this routine. When the SIP message includes no parameters for translation, this routine is terminated.

When the SIP message indicates other than the start of the SIP session and the end of the SIP session, and the SIP message includes parameters for translation, the address translator 1 sends the SIP message with tag information added thereto to the SIP address translator 2 (98), followed by termination of this routine.

When the SIP message indicates other than the start of the SIP session and the end of the SIP session, and the SIP message includes no parameters for translation, this routine is terminated.

Next, description will be made on an SIP-based audio communication performed between the terminal 6a in the network A and the terminal 6b in the network B in the third embodiment in accordance with sequences illustrated in FIGS. 33, 34 and 35.

Figure 33:
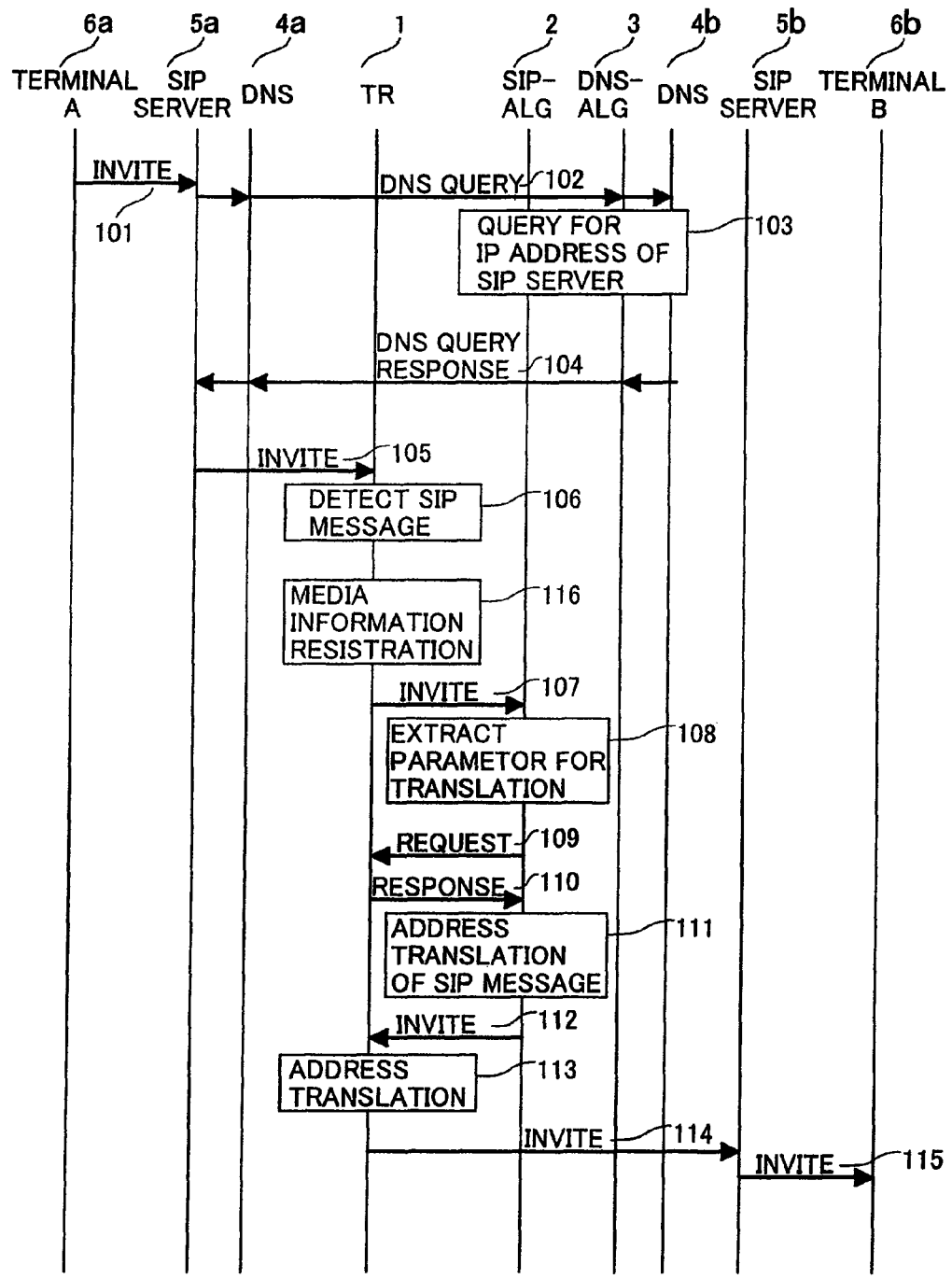
FIG. 33 is an SIP communication sequence diagram 1 in the third embodiment of the present invention.
Figure 34:
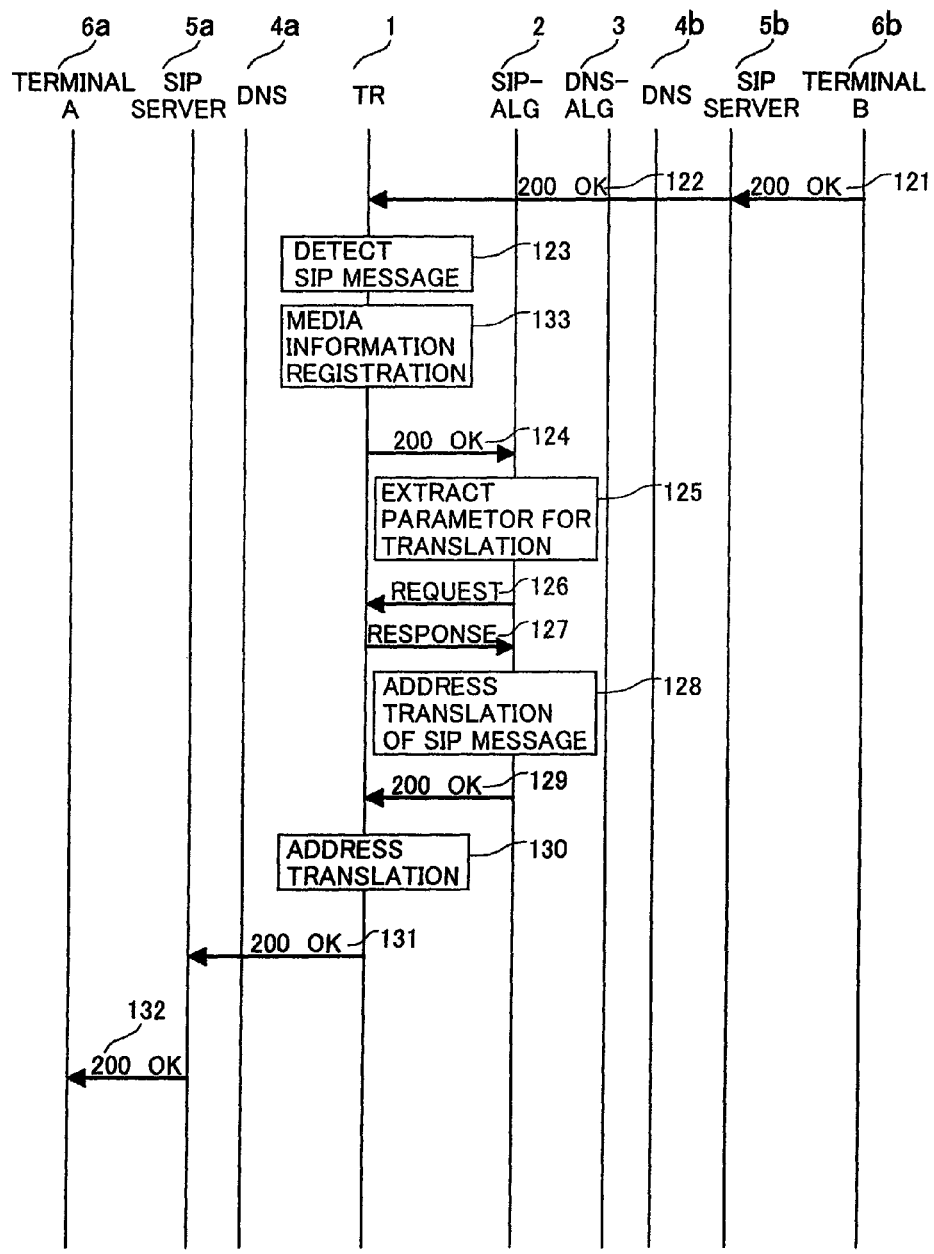
FIG. 34 is an SIP communication sequence diagram 2 in the third embodiment of the present invention.

FIGS. 33 and 34 illustrate an SIP session establishing sequence. The basic flow of the processing is identical to that in FIGS. 27 and 28.

A difference between FIGS. 33 and 27 lies in the addition of step 116 in FIG. 33.

A difference between FIGS. 34 and 28 lies in the addition of step 133 in FIG. 34.

At step 116 and step 133, the address translator 1 identifies that a detected SIP message indicates the start of a session, and stores information on a correspondence between tag information and the c-parameter and m-parameter included in the detected SIP message in the media information management table 310.

Figure 35:
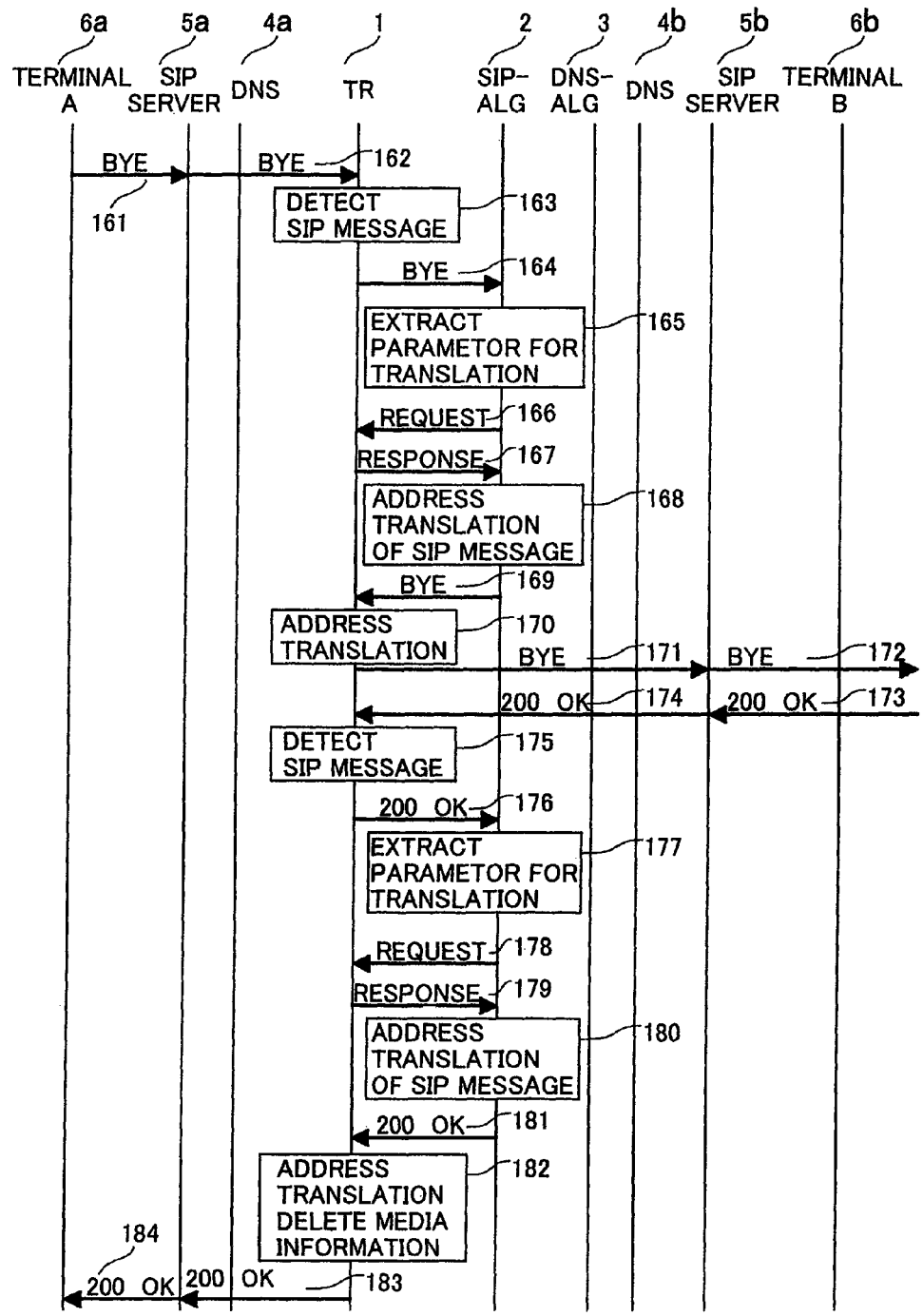
FIG. 35 is an SIP communication sequence diagram 3 in the third embodiment of the present invention.

FIG. 35 illustrates an SIP session terminating sequence. The basic flow is identical to that in FIGS. 27 and 28. The terminal 6a sends an SIP message (BYE) for requesting the end of an SIP session between itself and the terminal 6b to the SIP server 5a (161). The SIP server 5a sends the SIP message (BYE) to the virtual IPv6 address "vsipb6" of the SIP server 5b (162). The address translator 1 detects this SIP message (BYE), and sends the SIP message (BYE) with tag to the SIP address translator 2 (163, 164). The flow of SIP message translation processing (from 165 to 168) is similar to steps 108 to 111 in FIG. 27.

Upon receipt of the SIP message (BYE), in which parameters including the IP address have been rewritten, from the SIP address translator 2 (169), the address translator 1 translates addresses in the packet header including the SIP message (BYE) (170). The address translator 1 sends the SIP message (BYE) to the real IPv4 address "sipb4" of the SIP server 5b (171). The SIP server 5b sends the SIP message (BYE) to the terminal 6b (172).

When the terminal 6b has normally processed the SIP message (BYE), the terminal 6b sends a response SIP message (200 OK) to the SIP message (BYE) to the SIP server 5b (173).

The SIP server 5b sends a response SIP message (200 OK) to the SIP message (BYE) to the virtual IPv4 address "vsipa4" of the SIP server 5a (174).

Upon detection of the SIP message (200 OK), the address translator 1 detects that the received SIP message (200 OK) is a response to the SIP message (BYE) for requesting termination of the SIP session (175), and sends the SIP message (200 OK) with tag to the SIP address translator 2 (176). The flow of SIP message translation processing (from 177 to 180) is similar to the steps 108 to 111 in FIG. 27.

Upon receipt of the SIP message (200 OK), in which the parameters have been rewritten, from the SIP address translator 2 (181), the address translator 1 translates addresses in the packet header including the SIP message (200 OK). Next, the address translator 1 searches the tag management table 300 for an associated tag, using the call leg information in the SIP message (200 OK) as a search key. Then, the address translator 1 deletes a translation entry associated with the tag included in the translation information table 500, and an entry associated with the tag included in the media information management table 310 (182).

The address translator 1 sends the SIP message (200 OK) to the terminal 6b via the SIP server 5b (183, 184).

According to the third embodiment, since the address translator 1 has the correspondence relationship between the tag and call leg, the translation entry can be deleted at the end of an SIP communication.

Next, a fourth embodiment of the present invention will be described with reference to the drawings.

The fourth embodiment is characterized in that the IP address translator 1 comprises an SIP message translating means.

Figure 24:
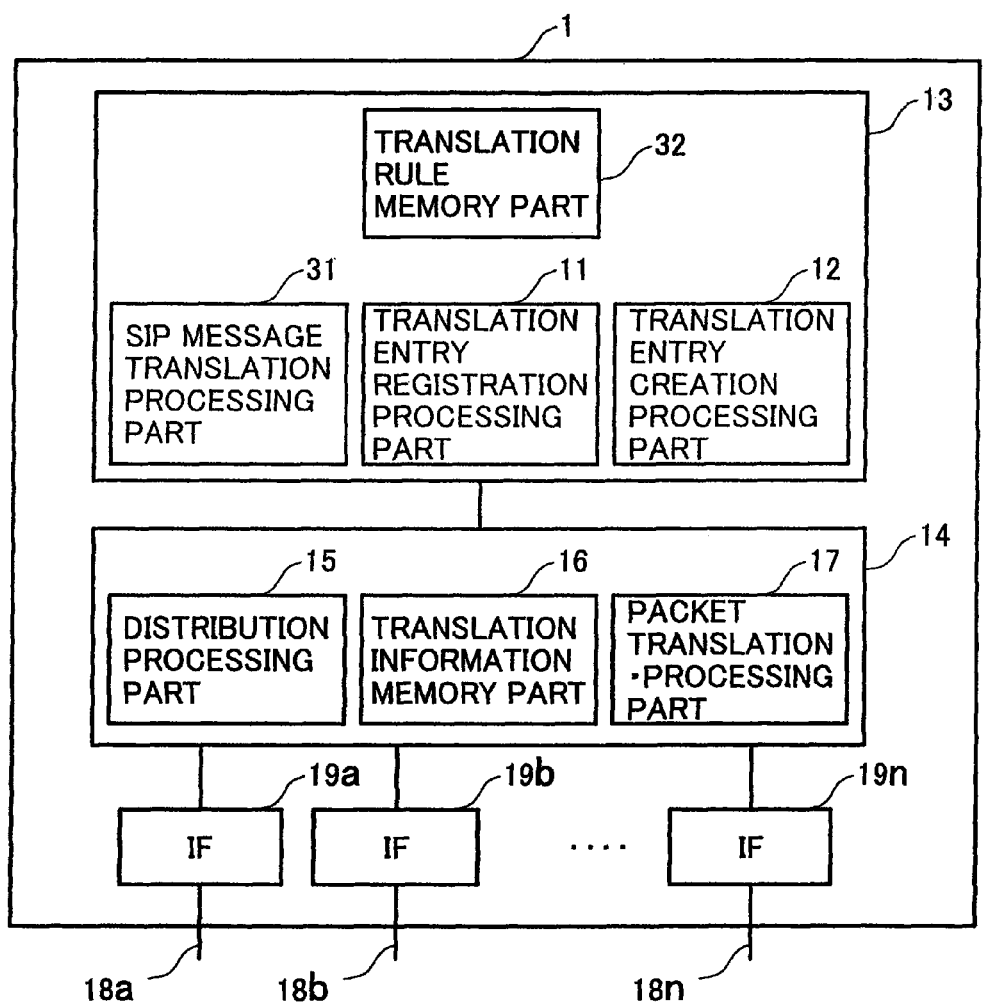
FIG. 24 is a block diagram of an address translator 1 in a fourth embodiment of the present invention.

FIG. 24 illustrates an exemplary configuration of the address translator 1 in the fourth embodiment.

The packet transfer control unit 13 comprises an SIP message translation processing part 31 and a translation rule memory part 32, in addition to the functional blocks of the address translator 1 in the first embodiment.

The SIP message translation processing part 31 has a function provided in the SIP message translation processing part 26 of the SIP address translator 2 in the first embodiment.

The translation rule memory part 32 has a function provided in the translation rule memory part 28 of the SIP address translator 2 in the first embodiment.

According to the fourth embodiment, since the address translator 1 comprises the SIP message translating means, the communication processing with the SIP address translator 2 can be omitted. It is therefore possible to provide faster processing involved in the SIP message translation.

Next, a fifth embodiment will be described.

In FIG. 1, the network A7 utilizes an IPv4 private address. The network B8 utilizes an IPv4 global address.

The address translator 1 comprises a function of translating the IPv4 private address to the IPv4 global address or vice versa, instead of the function of translating the IPv4 address and IPv6 address.

In the fifth embodiment, upon receipt of an SIP message from the IPv4 private network 7, the address translator 1 sends the SIP message to the SIP address translator 2. The SIP address translator 2 references the translation rule to identify IP addresses for translation. For example, the IP addresses for translation are the IPv4 private address of the SIP server 5a, and the IPv4 private address of the terminal 6a.

The SIP address translator 2 sends an address query request including the IP addresses for translation to the address translator 1.

Upon receipt of the address query request, the address translator 1 creates translation entries for the IPv4 private address and IPv4 global address. The address translator 1 sends an address query request response including the IPv4 private address before the translation and the translated IPv4 global address to the SIP address translator 2.

According to the fifth embodiment, when the network A7 and network B8 conforming to the IPv4 protocol are interconnected through the address translator 1, and the SIP address translator 2 rewrites IP addresses included in an SIP message, the SIP-based audio communication can be accomplished between a terminal belonging to the network A7 and a terminal belonging to the network B8.

As will be apparent from the foregoing embodiment, the SIP address translator 2 rewrites the contents of an SIP message, making use of translation information of the address translator 1, so that the SIP-based audio communication can be accomplished between terminals which exist in different regions. When the address translator 1 comprises a function of detecting parameters for translation in an SIP message, and adds identification information (tag) to the parameters for translation, the processing in the SIP address translator 2 can be reduced. Further, when the address translator 1 comprises a correspondence relationship between the identification information and call leg, and a function of detecting the start of an SIP session and the end of the SIP session, the address translator 1 can delete associated entries at the end of a communication. It is therefore possible to provide more detailed SIP communication control.

When the address translator 1 comprises an SIP message translating means, the communication processing with the SIP message translator 2 can be omitted.

It should be further understood by those skilled in the art that the foregoing description has been made on embodiments of the invention and that various changes and modifications may be made in the invention without departing from the spirit of the invention and the scope of the appended claims.

What is claimed is:

1. An address translator to be coupled to a first network utilizing a global address, and to be coupled to a second network utilizing a private address, said address translator comprising:
   an address translating unit which translates, in a Layer 3 region of communication data the global address into the private address, or translates, in a Layer 3 region of communication data, the private address into the global address;
   a detecting unit which detects that the communication data conforms to a particular protocol based on a port number contained in a header corresponding to a Layer 4 region of the communication data;
   a creating unit which creates translation information including a correspondence relationship between the global address and the private address for translating a Layer 3 address contained in a region of the communication data higher than the Layer 3 region, when the detecting unit detects that the communication data conforms to the particular protocol, and
   a communicating unit which communicates with a server device, and
   wherein said address translator sends said translation information and the region of the communication data higher than the Layer 3 region to said server device, and receives information including said Layer 3 address described in the region of the communication data higher than the Layer 3 region which has been translated by said server device,
   wherein said region of the communication data higher than the Layer 3 region comprises a parameter which requires translation of the region of the communication data higher than the Layer 3 region,
   wherein said address translator sends to said region of the communication data higher than the Layer 3 region with a tag added to said parameter by said address translator, and
   wherein said server device extracts the parameter which requires the translation from the region of the communication data higher than the Layer 3 region based on said tag which requires the translation of the region of the communication data higher than the Layer 3 region.

2. The address translator according to claim 1, wherein at least a portion of the region of the communication data higher than the Layer 3 region is described by Session Initiation Protocol (SIP) and includes the Layer 3 address.

3. The address translator according to claim 1, wherein the particular protocol is a Session Initiation Protocol (SIP).

4. The address translator according to claim 1, wherein a port number is described in a Transport layer as Layer 4.

5. The address translator according to claim 1, wherein a port number is described by Transmission Control Protocol (TCP) as Layer 4.

6. The address translator according to claim 1, wherein a port number is described by User Datagram Protocol (UDP) as Layer 4.

7. The address translator according to claim 1, wherein a port number is an identifier, indicating that the region of the communication data higher than the Layer 3 region described by Session Initiation Protocol (SIP).

8. An address translating system comprising:
   an address translator, which is connected to a first network utilizing a global address and second network utilizing a private address; and
   a server device,
   wherein the address translator comprises:
   an address translating unit which translates, in a Layer 3 region of communication data, the global address, or translates, in a Layer 3 region of communication data, the private address into the global address;
   a detecting unit which detects that the communication data conforms to a particular protocol based on a port number contained in a header corresponding to a Layer 4 region of the communication data;
   a creating unit which creates translation information including a correspondence relationship between the global address and the private address for translating a Layer 3 address contained in a region of the communication data higher than the Layer 3 region, when the detecting unit detects that the communication data conforms to the particular protocol, and
   a communicating unit which communicates with a server device, wherein said address translator sends said translation information and the region of the communication data higher than the Layer 3 region to said server device, and receives information including said Layer 3 address described in the region of the communication data higher than the Layer 3 region which has been translated by said server device,
   wherein the region of the communication data higher than the Layer 3 region, which is sent from the address translator to the server device, comprises a parameter which requires translation of the region of the communication data higher than the Layer 3 region of the communication data,
   wherein the address translator sends the region of the communication data higher than the Layer 3 region with a tag added to the parameter which requires the translation of the region of the communication data higher than the Layer 3 region, and
   wherein the server device extracts the parameter which requires the translation from the region of the communication data higher than the Layer 3 region based on the tag.

9. The address translating system according to claim 8, wherein at least a portion of the region of the communication data higher than the Layer 3 region is described by Session Initiation Protocol (SIP) and includes the Layer 3 address.

10. The address translating system according to claim 8, wherein the server device receives the translation information and the region of the communication data higher than the Layer 3 region from the address translator, and translates the global address described in the region of the communication data higher than the Layer 3 region to the private address based on the translation information, and sends information including the Layer 3 address described in the region of the communication data higher than the Layer 3 region which has been translated by the server device.

11. The address translating system according to claim 8, wherein the particular protocol is a Session Initiation Protocol (SIP).

12. The address translating system according to claim 8, wherein the port number described in a Transport layer as Layer 4.

13. The address translating system according to claim 8, wherein a port number described by Transmission Control Protocol (TCP) as Layer 4.

14. The address translating system according to claim 8, wherein a port number described by User Datagram Protocol (UDP) as Layer 4.

15. The address translating system according to claim 8, wherein a port number is an identifier indicating that the region of the communication data higher than the Layer 3 region is described by Session Initiation Protocol (SIP).

* * * * *